(12) United States Patent
Iwase et al.

(10) Patent No.: US 11,183,170 B2
(45) Date of Patent: Nov. 23, 2021

(54) INTERACTION CONTROL APPARATUS AND METHOD

(71) Applicant: SONY CORPORATION, Tokyo (JP)

(72) Inventors: Hiro Iwase, Kanagawa (JP); Mari Saito, Kanagawa (JP); Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 323 days.

(21) Appl. No.: 16/321,328

(22) PCT Filed: Aug. 3, 2017

(86) PCT No.: PCT/JP2017/028292
§ 371 (c)(1),
(2) Date: Jan. 28, 2019

(87) PCT Pub. No.: WO2018/034169
PCT Pub. Date: Feb. 22, 2018

(65) Prior Publication Data
US 2020/0184950 A1 Jun. 11, 2020

(30) Foreign Application Priority Data
Aug. 17, 2016 (JP) .............................. JP2016-159864

(51) Int. Cl.
*G10L 13/08* (2013.01)
*G10L 15/18* (2013.01)
(Continued)

(52) U.S. Cl.
CPC .............. *G10L 13/08* (2013.01); *G10L 13/00* (2013.01); *G10L 15/1815* (2013.01);
(Continued)

(58) Field of Classification Search
CPC ... G10L 15/22; G10L 2015/223; G10L 15/26; G10L 15/1815; G10L 13/00; G10L 15/18;
(Continued)

(56) References Cited

U.S. PATENT DOCUMENTS

| | | | | |
|---|---|---|---|---|
| 7,502,739 B2 * | 3/2009 | Saito | ....................... | G10L 13/10 704/260 |
| 2007/0255566 A1 * | 11/2007 | Nguyen | .................. | G10L 15/22 704/257 |

(Continued)

FOREIGN PATENT DOCUMENTS

| JP | 30-247697 A | 12/1985 |
|---|---|---|
| JP | 60-247697 A | 12/1985 |

(Continued)

OTHER PUBLICATIONS

International Search Report and Written Opinion of PCT Application No. PCT/JP2017/028292, dated Oct. 24, 2017, 9 pages of ISRWO.

(Continued)

*Primary Examiner* — Matthew H Baker
(74) *Attorney, Agent, or Firm* — Chip Law Group

(57) ABSTRACT

The present technology relates to an interaction control apparatus and a method that enable more appropriate interaction control to be performed. The interaction control apparatus includes an interaction progress controller that causes an utterance to be made in one or a plurality of understanding action request positions on the basis of utterance text that has been divided in the one or the plurality of understanding action request positions, the utterance inducing a user to perform an understanding action, and that controls a next utterance on the basis of a result of detecting the understanding action and the utterance text. The present technology is applicable to a speech interaction system.

17 Claims, 9 Drawing Sheets

(51) Int. Cl.
*G10L 15/22* (2006.01)
*G10L 13/00* (2006.01)

(52) U.S. Cl.
CPC .......... *G10L 15/1822* (2013.01); *G10L 15/22* (2013.01); *G10L 2015/223* (2013.01)

(58) Field of Classification Search
CPC ........... G10L 15/1822; G10L 2015/226; G10L 13/08; G10L 15/30; G10L 17/00; G10L 17/22; G10L 2015/228; G10L 25/21; G10L 25/51; G10L 13/086; G10L 15/063; G10L 15/16; G10L 15/1807; G10L 15/197; G10L 15/24; G10L 17/02; G10L 17/06; G10L 17/10; G10L 17/12; G10L 2015/221; G10L 2015/225; G10L 2015/227; G10L 25/24; G10L 25/60
See application file for complete search history.

(56) References Cited

U.S. PATENT DOCUMENTS

| | | | |
|---|---|---|---|
| 2009/0326944 | A1 | 12/2009 | Yano et al. |
| 2016/0372138 | A1* | 12/2016 | Shinkai .................. G10L 15/22 |
| 2018/0042546 | A1* | 2/2018 | Hwang ................. A61B 5/7275 |
| 2018/0233142 | A1* | 8/2018 | Koishida ............... A61B 5/7475 |
| 2019/0148275 | A1* | 5/2019 | Muthukumar .......... H01L 24/73 |
| | | | 257/738 |
| 2020/0104653 | A1* | 4/2020 | Solomon ............ G06K 9/00348 |

FOREIGN PATENT DOCUMENTS

| | | |
|---|---|---|
| JP | 06-342297 A | 12/1994 |
| JP | 36-342297 A | 12/1994 |
| JP | 10-83196 A | 3/1998 |
| JP | 10-083196 A | 3/1998 |
| JP | 10-116117 A | 5/1998 |
| JP | 10-116177 A | 5/1998 |
| JP | 2005-202076 A | 7/2005 |
| JP | 2010-008854 A | 1/2010 |
| JP | 2010-157081 A | 7/2010 |
| JP | 4505862 B2 | 7/2010 |
| WO | 2008/001549 A1 | 1/2008 |

OTHER PUBLICATIONS

Office Action for JP Patent Application No. 2018-534342, dated Jul. 27, 2021, 04 pages of English Translation and 36 pages of Office Action.

* cited by examiner

INTERACTION CONTROL APPARATUS AND METHOD

TECHNICAL FIELD

The present technology relates to an interaction control apparatus and a method, and in particular, an interaction control apparatus and a method that enable more appropriate interaction control to be performed.

BACKGROUND ART

Conventionally, a technology for controlling speech interaction with a user is known.

Examples of the technology described above include a technology for requesting speech utterance from a user, determining a degree of understanding of the user on the basis of keywords uttered by the user, and advancing interaction in accordance with a determination result (see, for example, Patent Document 1).

Furthermore, for example, a technology for detecting a quick-response action of a user or requesting a quick response from the user in interaction with the user has also been proposed (see, for example, Patent Document 2).

CITATION LIST

Patent Document

Patent Document 1: Japanese Patent Application Laid-Open No. 2005-234331
Patent Document 2: Japanese Patent Application Laid-Open No. H9-218770

SUMMARY OF THE INVENTION

Problems to be Solved by the Invention

However, in the technology described above, it is difficult to appropriately control speech interaction with a user.

For example, in a technology for determining a degree of understanding of a user on the basis of keywords, a message prompting the user to input speech is output in accordance with the degree of understanding of the user. However, in a case where a system presents, via speech, a large amount of information to be transmitted to the user, such as a long list of items to be transmitted to the user or a long sentence indicating the content to be transmitted, the degree of understanding of the user fails to be measured on an appropriate granularity, namely, at an appropriate timing.

Synthesized speech in Text To Speech (TTS) has a constant speed and intonation. In a case where an amount of information is large and sentences to be uttered via speech are long, there is a possibility that interaction control that is not suitable for a user's situation will be performed, for example, so as to make an utterance at a slow speed or to frequently prompt the user to input speech, even when the user understands the content of utterance and concentrates on listening to the utterance. In such a case, it is difficult for the user to understand the content of utterance, and it is also difficult for the user to remember the content of utterance.

Furthermore, in the technology described above, an understanding action itself that will impose a small burden on a user, such as a quick response or nodding, fails to be induced during speech interaction, namely, in the middle of a sentence of utterance speech.

Therefore, the understanding action that will impose a small burden on the user fails to be requested from the user on an appropriate granularity, for example, by controlling a frequency of requesting the understanding action in a division between bunsetsus (phrases) that are shorter than a sentence or a semantic division in accordance with a degree of concentration or a degree of understanding of the user.

The present technology has been created in view of the situation described above, and the present technology enables more appropriate interaction control to be performed.

Solutions to Problems

An interaction control apparatus in one aspect of the present technology includes an interaction progress controller that causes an utterance to be made in one or a plurality of understanding action request positions on the basis of utterance text that has been divided in the one or the plurality of understanding action request positions, the utterance inducing a user to perform an understanding action, and that controls a next utterance on the basis of a result of detecting the understanding action and the utterance text.

In a case where the understanding action performed by the user is an affirmative action, the interaction progress controller can be made to cause next words that have not yet been uttered of the utterance text to be uttered.

In a case where the understanding action performed by the user is a negative action, the interaction progress controller can be made to cause an utterance made most recently to be made again.

The interaction progress controller can be made to control an utterance based on the utterance text in such a way that, as a response time of an affirmative understanding action performed by the user is reduced, a number of times of induction of the understanding action is also reduced.

The interaction progress controller can be made to control an utterance based on the utterance text in such a way that, as a response time of an affirmative understanding action performed by the user is reduced, an utterance speed is increased.

The interaction progress controller can be made to control an utterance based on the utterance text in such a way that, as a response time of an affirmative understanding action performed by the user is reduced, a tone of the utterance becomes higher.

In a case where the understanding action performed by the user is not detected within a prescribed time period, the interaction progress controller can be made to cause an utterance made most recently to be made again or can be made to cause an utterance requesting the understanding action to be made.

In a case where an utterance based on the utterance text is stopped in a middle, the interaction progress controller can be made to control an output of report information including the utterance text.

The interaction progress controller can be made to cause an utterance inducing the understanding action to be made by adding incomplete words to words based on the utterance text.

The interaction progress controller can be made to cause the utterance inducing the understanding action to be made by adding intonation to an ending of an utterance.

The interaction progress controller can be made to cause an utterance inducing the understanding action to be made by giving a pause in each of the one or the plurality of understanding action request positions.

The interaction control apparatus can be further provided with an understanding action request position detector that detects, as each of the one or the plurality of understanding action request positions, a position where a sentence in sentences of the utterance text is not concluded.

The understanding action request position detector can be made to detect, as each of the one or the plurality of understanding action request positions, a position based on a modification relationship with a predicate clause of the sentences of the utterance text.

The understanding action request position detector can be made to detect, as the one or the plurality of understanding action request positions, respective positions between a plurality of bunsetsus or phrases serving as an object case, the plurality of bunsetsus or phrases modifying an identical predicate clause in the sentences of the utterance text.

The understanding action request position detector can be made to detect, as each of the one or the plurality of understanding action request positions, a position of a bunsetsu or a phrase that first modifies the predicate clause in the sentences of the utterance text.

The understanding action request position detector can be made to detect, as each of the one or the plurality of understanding action request positions, a position of a bunsetsu or a phrase serving as a time case, a locative case, an object case, or a causal case in the sentences of the utterance text.

An interaction control method in one aspect of the present technology includes a step of causing an utterance to be made in one or a plurality of understanding action request positions on the basis of utterance text that has been divided in the one or the plurality of understanding action request positions, the utterance inducing a user to perform an understanding action, and controlling a next utterance on the basis of a result of detecting the understanding action and the utterance text.

In one aspect of the present technology, an utterance inducing a user to perform an understanding action is made in one or a plurality of understanding action request positions on the basis of utterance text that has been divided in the one or the plurality of understanding action request positions, and a next utterance is controlled on the basis of a result of detecting the understanding action and the utterance text.

Effects of the Invention

In one aspect of the present technology, more appropriate interaction control can be performed.

Note that the effect described here is not necessarily restrictive, and any of effects described in the present disclosure may be exhibited.

MODE FOR CARRYING OUT THE INVENTION

Figure 1:
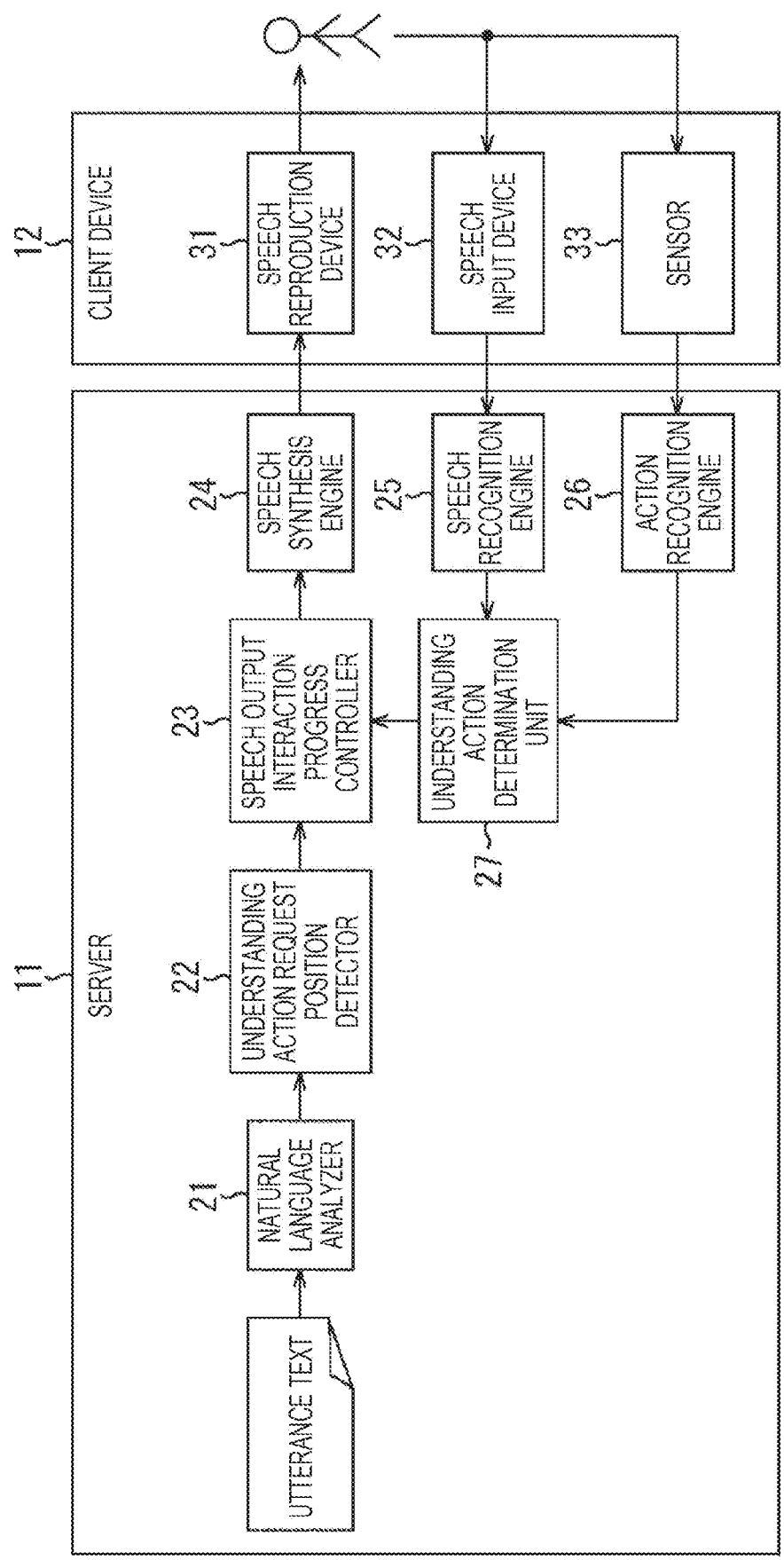
FIG. 1 illustrates an example of the configuration of a speech interaction system.

Embodiments to which the present technology has been applied are described below with reference to the drawings.

First Embodiment

<Example of Configuration of Speech Interaction System>

The present technology enables appropriate interaction control to be performed by dividing utterance text into sections in which an understanding action will be requested from a user and requesting the understanding action from the user in a position of division and by generating next utterance speech on the basis of the user's understanding action and the utterance text.

In particular, the present technology has the following two technical features.

First, as a first feature, in the present technology, natural language analysis is performed on utterance text serving as sentences to be uttered via speech, and a point at which an understanding action using a quick response or nodding is requested from a user is extracted. Then, in speech utterance, the understanding action of the user is induced by adding incomplete words or intonation or inserting a long time period in the middle of the utterance text.

Here, the understanding action performed by the user refers to an action, such as nodding or a quick response, that indicates whether or not the user understands the content of utterance. Furthermore, a point, namely, a position, where the understanding action is requested from the user is, for example, the position of a break in enumerated pieces of information to be transmitted to the user or the branching position of a modification relationship. As described above, by extracting a position where the understanding action is requested from the user on the basis of a result of natural language analysis, the understanding action of the user can be induced on an appropriate granularity for each utterance text. This enables appropriate interaction control to be performed.

Note that, hereinafter, the point (the position) where the understanding action is requested from the user is also referred to, in particular, as an understanding action request position.

Furthermore, as a second feature, in the present technology, the type of an understanding action, such as a "quick response" or "nodding", of a user, namely, whether the understanding action of the user is an affirmative action or a negative response, is determined, and a response time before the understanding action of the user is measured. Then, a degree of understanding and a degree of concentration on speech utterance of the user are estimated and determined on the basis of a determination result and a measurement result, and the progress of utterance with the induction of the understanding action is dynamically controlled as needed in accordance with the degree of understanding and the degree of concentration.

Specifically, control C1 to control C4 are performed, for example.

(Control C1)

Interaction control is performed in such a way that utterance speech is temporarily stopped in an understanding action request position in utterance text, and a pause is given to utterance and the utterance is not advanced until a user performs an affirmative understanding action (agreement).

(Control C2)

Interaction control is performed in such a way that, in a case where a prescribed time period has passed after the induction of an understanding action but a user does not perform the understanding action, the preceding content of utterance is repeated, words prompting the understanding action are inserted, or a combination thereof is performed.

(Control C3) Interaction control is performed in such a way that, in a case where the type of an understanding action of a user is a negative type, the preceding content of utterance is repeated.

(Control C4)

Interaction control is performed in such a way that, in a case where a response time of an understanding action of a user is measured and the response time is short, it is determined that a degree of understanding and a degree of concentration of the user are high, the number of times of inducing the user to perform the understanding action is reduced, and the speed and tone of utterance speech are increased, and when it is determined that the degree of understanding and the degree of concentration of the user are low, the number of times of induction is increased and the speed and tone of utterance speech are reduced.

In the present technology, by performing the interaction control described above, an understanding action can be prompted at an appropriate timing in accordance with a degree of understanding and a degree of concentration of a user, and natural speech interaction can be realized.

Next, a specific embodiment to which the present technology has been applied is described.

FIG. 1 illustrates an example of a configuration according to an embodiment of a speech interaction system to which the present technology has been applied.

The speech interaction system illustrated in FIG. 1 includes a server 11 and a client device 12, and is a system that performs speech interaction with a user. In this example, the server 11 and the client device 12 that is configured by a terminal device such as a smartphone are directly connected to each other, for example, by wire or wirelessly, or are indirectly connected to each other via a communication network.

The server 11 functions as an interaction control apparatus, and the server 11 generates speech data of speech utterance on the basis of feedback of an understanding action from the user and utterance text that is text data indicating the content of utterance, and outputs the speech data to the client device 12.

The client device 12 outputs utterance speech to the user on the basis of the speech data supplied from the server 11, and the client device 12 appropriately receives feedback from the user, and supplies the feedback to the server 11.

The server 11 includes a natural language analyzer 21, an understanding action request position detector 22, a speech output interaction progress controller 23, a speech synthesis engine 24, a speech recognition engine 25, an action recognition engine 26, and an understanding action determination unit 27. Furthermore, the client device 12 includes a speech reproduction device 31, a speech input device 32, and a sensor 33.

Note that an example in which the speech synthesis engine 24 is provided in the server 11 is described here, but the speech synthesis engine 24 may be provided in the client device 12.

Utterance text that is all of the sentences of the content of information to be presented to the user via speech utterance is input to the natural language analyzer 21 of the server 11. The natural language analyzer 21 performs natural language analysis on the input utterance text, and supplies an analysis result and the utterance text to the understanding action request position detector 22.

The understanding action request position detector 22 detects an understanding action request position in which an understanding action is requested from the user in the sentences indicated by the utterance text on the basis of the analysis result and the utterance text that have been supplied from the natural language analyzer 21.

The understanding action request position is a position that is a candidate for a position in which an utterance will be made that induces the user to perform the understanding action at the time of utterance based on the utterance text. When the understanding action request position detector 22 detects the understanding action request position from the sentences of the utterance text, utterance text that has been divided in one or a plurality of understanding action request positions is obtained.

The understanding action request position detector 22 supplies a result of detecting the understanding action request position and the utterance text to the speech output interaction progress controller 23.

The speech output interaction progress controller 23 controls speech utterance based on the utterance text on the basis of the result of detecting the understanding action request position and the utterance text that have been supplied from the understanding action request position detector 22 and a result of determining the understanding action of the user that has been supplied from the understanding action determination unit 27.

In other words, the speech output interaction progress controller 23 controls interaction with the user by outputting text data indicating utterance words based on the utterance text to the speech synthesis engine 24 at an appropriate timing. At this time, the speech output interaction progress controller 23 adds incomplete words that induce the user to perform the understanding action to the utterance words indicated by the utterance text and outputs the utterance words, issues an instruction to add intonation to the speech synthesis engine 24, or gives a pause to utterance by controlling an output timing of the utterance words, as needed.

Note that, hereinafter, the incomplete words that are added to the utterance words in order to induce the user to perform the understanding action are also referred to as understanding action inducing words.

Furthermore, an example is described here in which the understanding action inducing words are appropriately added to the utterance words indicated by the utterance text in the understanding action request position and the user is induced to perform the understanding action, but a function of inducing the understanding action may be turned on or off according to settings performed by the user or the like. Furthermore, a result of setting whether the function of inducing the understanding action is turned on or off may be recorded in the speech output interaction progress controller 23.

In this case, for example, in a case where the function of inducing the understanding action is set to the OFF state, the speech output interaction progress controller 23 outputs the utterance text with no change to the speech synthesis engine 24 without the addition of the understanding action inducing words, or the like.

The speech synthesis engine 24 performs Text To Speech (TTS) on the basis of the utterance words supplied from the speech output interaction progress controller 23 so as to generate speech data for reproducing the utterance words via speech, and outputs the speech data to the speech reproduction device 31. In other words, in the speech synthesis engine 24, the text data indicating the utterance words is converted into speech data of the utterance words.

The speech reproduction device 31 includes a speech output unit that is configured, for example, by a speaker, and the speech reproduction device 31 reproduces speech of the utterance words on the basis of the speech data supplied from the speech synthesis engine 24.

When the speech of the utterance words is reproduced, the user listens to reproduced sound, and performs an understanding action such as a quick response or nodding in accordance with the situation. Stated another way, as feedback to the induction of an understanding action, an understanding action such as a quick response or nodding is performed by the user.

The speech input device 32 is configured, for example, by a microphone, and the speech input device 32 collects the speech of a quick response of the user serving as the understanding action, and supplies collected speech data obtained as a result to the speech recognition engine 25. The speech recognition engine 25 performs speech recognition on the collected speech data supplied from the speech input device 32, and supplies a result of speech recognition to the understanding action determination unit 27. For example, quick-response speech based on the collected speech data is converted into text in speech recognition, and obtained text data is output as a result of speech recognition to the understanding action determination unit 27.

The sensor 33 is configured, for example, by a gyrosensor attached to the head of the user, a sensor that is arranged near the user and detects the movement of the head of the user, an image sensor that captures an image of the head of the user, and the like, and the sensor 33 detects nodding, namely, the movement of the head of the user, that serves as the understanding action of the user, and supplies a detection result to the action recognition engine 26.

The action recognition engine 26 performs action recognition on the basis of a result of detecting nodding of the user that has been supplied from the sensor 33 so as to recognize (determine) the type of the nodding of the user, and supplies a recognition result to the understanding action determination unit 27.

The understanding action determination unit 27 determines whether the understanding action of the user is an affirmative understanding action or a negative understanding action on the basis of at least any one of the result of speech recognition from the speech recognition engine 25 or a result of recognizing the type of nodding from the action recognition engine 26, and supplies a determination result to the speech output interaction progress controller 23.

A result of determining the understanding action that has been obtained as described above is used for the speech output interaction progress controller 23 to control an utterance subsequent to an utterance in which the understanding action has been induced.

Note that, in understanding action determination processing performed by the understanding action determination unit 27, at least any one of the result of speech recognition from the speech recognition engine 25 or the result of recognizing the type of nodding from the action recognition engine 26 may be used.

For example, in a case where the understanding action is determined on the basis of the result of speech recognition, the understanding action determination unit 27 determines whether quick-response speech of the user serving as the understanding action is an affirmative quick response or a negative quick response on the basis of the result of speech recognition.

Specifically, for example, in a case where text data indicating "un (yeah)", "hai (yes)", or the like is obtained as quick-response speech as a result of speech recognition, the understanding action determination unit 27 determines that the understanding action of the user is an affirmative understanding action, namely, the quick-response speech is an affirmative quick response.

In contrast, for example, in a case where text data indicating "e (eh)", "nani (what)", "mouikkai (one more time)", or the like is obtained as quick-response speech as a result of speech recognition, the understanding action determination unit 27 determines that the understanding action of the user is a negative understanding action, namely, the quick-response speech is a negative quick response.

Note that, in a case where the speech recognition engine 25 fails to recognize quick-response speech, the understanding action determination unit 27 may determine that the user has performed an understanding action, for example, when the user has made a certain speech utterance response in the detection of a speech section, and may output a result of determining the understanding action.

In such a case, for example, in the design phase, setting may be performed according to the performance, namely, performance reliability, of the speech recognition engine 25 as to whether the understanding action of the user is determined to be affirmative or negative when quick-response speech has failed to be recognized but the user has made a certain speech utterance response.

For example, in a case where the performance reliability of the speech recognition engine 25 is low, when the user has made a certain speech utterance response, if the user's understanding action is determined to be negative, speech utterance (interaction) does not advance. Therefore, setting may be performed in such a way that the user's understanding action is determined to be an affirmative understanding action (affirmative quick-response speech).

In contrast, in a case where the performance reliability of the speech recognition engine 25 is high, there is a high probability that a second quick response of the user will be able to be correctly recognized. Therefore, setting may be performed in such a way that, when the user has made a certain speech utterance response, the user's understanding action is determined to be a negative understanding action (negative quick-response speech).

Furthermore, for example, in a case where the understanding action is determined on the basis of a result of recognizing the type of nodding of the user, the understanding action determination unit 27 determines whether the user's nodding serving as the understanding action is affirmative nodding or negative nodding on the basis of a recognition result.

For example, in a case where the sensor 33 is a gyrosensor attached to the head or the like of the user or a sensor that detects a movement of the user's head, the action recognition engine 26 recognizes the type of nodding, such as whether the user has performed a movement to shake the head in a vertical direction or whether the user has performed a movement to shake the head in a horizontal direction, on the basis of an output from the sensor 33.

Then, in a case where a recognition result indicating the user has shaken the head in the vertical direction is obtained on the basis of a result of recognizing the type of nodding, the understanding action determination unit 27 determines that the user's understanding action is an affirmative understanding action. In contrast, in a case where a recognition result indicating the user has shaken the head in the horizontal direction is obtained, the understanding action determination unit 27 determines that the user's understanding action is a negative understanding action.

Furthermore, for example, in a case where the sensor 33 is configured by an image sensor that captures an image of the user's head, or the like, in the action recognition engine 26, image recognition is performed on the image captured by the sensor 33, and the user's nodding in the vertical direction or the horizontal direction, namely, the type of nodding, is recognized.

Moreover, for example, in a case where both a speech recognition result of the speech recognition engine 25 and a result of recognizing the type of nodding of the action recognition engine 26 are obtained, the understanding action may be determined with these recognition results prioritized according to the reliabilities (recognition accuracies) of determination engines, namely, the speech recognition engine 25 and the action recognition engine 26.

In such a case, for example, when the reliability of the speech recognition engine 25 is higher than the reliability of the action recognition engine 26, the understanding action determination unit 27 performs processing for determining the understanding action on the basis of the speech recognition result of the speech recognition engine 25. Furthermore, in a case where the speech recognition engine 25 has failed to correctly perform speech recognition, the understanding action determination unit 27 performs the processing for determining the understanding action on the basis of the result of recognizing the type of nodding of the action recognition engine 26.

Moreover, for example, in a case where an ambiguous recognition result such as "uun (hmm)", namely, a recognition result that can be determined to be both affirmative and negative, is obtained as a result of speech recognition, the understanding action determination unit 27 may determine the understanding action by also using the intonation of the user's quick-response speech, the user's movement, a direction of a line of sight of the user, a movement of the line of sight of the user, and the like. In this case, what speech recognition result will be determined to be an ambiguous recognition result may be set, for example, by registering in advance words that will be determined to be the ambiguous recognition result.

For example, in a case where an ambiguous speech recognition result is obtained, the understanding action determination unit 27 determines the user's understanding action on the basis of the result of recognizing the type of nodding of the action recognition engine 26.

Furthermore, for example, in the speech interaction system, the user's movement such as nodding, the direction of a line of sight, or a movement of the light of sight of the user, or the intonation of the user's speech at the time of making an ambiguous quick-response speech such as "uun (hmm)" may be learnt with feedback, and a dictionary indicating a result of learning may be generated.

In such a case, at the time of learning with feedback, the user makes a quick-response speech, and inputs whether the quick-response speech is affirmative or negative. Then, in the speech interaction system, a dictionary is generated from an input result, a result of recognizing the quick-response speech that has been obtained in speech recognition, and the user's movement such as nodding or the intonation of speech that has been detected.

When a speech recognition result indicating an ambiguous quick-response speech is obtained at the time of an actual speech utterance, the understanding action determination unit 27 determines the user's understanding action on the basis of the intonation of speech that has been obtained from collected speech data collected by the speech input device 32, the user's movement that has been obtained by the sensor 33 or the like, or the like, and the dictionary registered in advance.

Note that an example in which the speech input device 32 and the sensor 33 are provided as a configuration that detects a user's understanding action in the client device 12 has been described above, but the user's understanding action may be detected according to any other method.

For example, a specified button or a touch panel may be provided in the client device 12, and a user may press the button or may touch the touch panel. In other words, an operation to be performed on the button, the touch panel, or the like by the user may be performed as an understanding action, and feedback from the user may be given to the speech interaction system.

Furthermore, a line-of-sight detection sensor may be provided in the client device 12, and a user's understanding action may be determined on the basis of an output of the line-of-sight detection sensor. In such a case, for example, when it is detected that a user has directed a line of sight in a specified direction such as target equipment, the user's understanding action is determined to be an affirmative understanding action.

Moreover, in the client device 12, the speech input device 32 and the sensor 33 may be provided integrally with the speech reproduction device 31, or may be provided separately from an apparatus in which the speech reproduction device 31 is provided.

Specifically, for example, the speech reproduction device 31 may be provided in a smartphone, and the speech input device 32 and the sensor 33 may be connected to the smartphone. In such a case, for example, the smartphone may obtain collected speech data and a result of detecting a user's movement from the speech input device 32 and the sensor 33, and may transmit the collected speech data and the result to the speech recognition engine 25 and the action recognition engine 26.

<Natural Language Analysis and Understanding Action Request Position>

Next, a specific example of a method for detecting an understanding action request position performed by the understanding action request position detector 22 is described.

Figure 2:
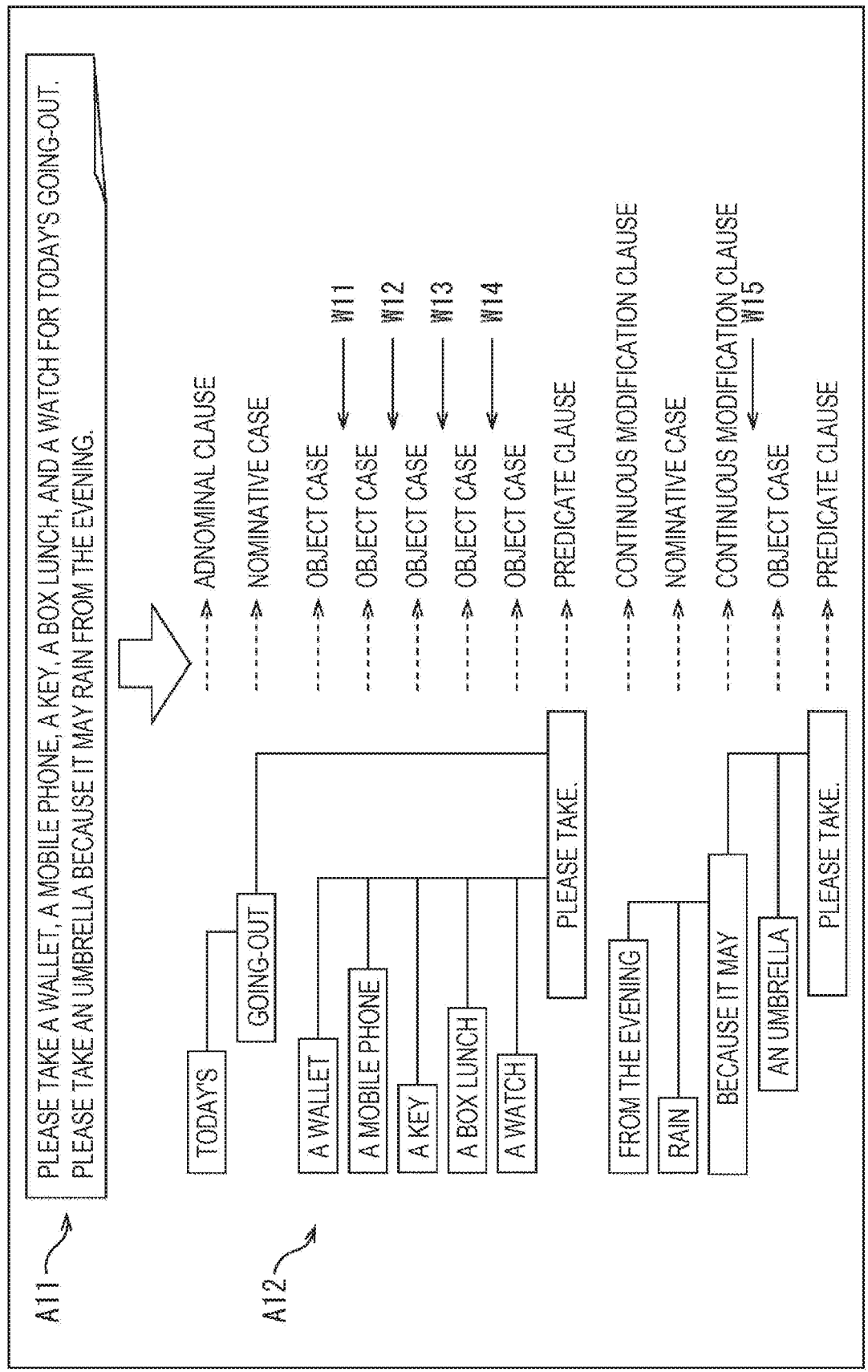
FIG. 2 is a diagram explaining the detection of an understanding action request position.

Assume, for example, that the text data "kyonoodekakewa, saifutokeitaidenwatokagitobentototokeiomotteittekudasai (Please take a wallet, a mobile phone, a key, a box lunch, and a watch for today's going-out). yugatakaraamegafurukamoshirenainodekasaomotteittekudasai (Please take an umbrella because it may rain from the evening).", as pointed by arrow A11 in FIG. 2, is input as utterance text to the natural language analyzer 21.

In this case, when morphological analysis is performed, for example, as natural language analysis on the utterance text in the natural language analyzer 21, the analysis result pointed by arrow A12 is obtained. In morphological analysis, sentences of the input utterance text are divided into bunsetsu units, and information relating to a linguistic case of each bunsetsu and information indicating a structure of a modification relationship of each of the bunsetsus are obtained as an analysis result.

In the portion pointed by arrow A12, each quadrangle indicates a single bunsetsu, and in each of the quadrangles, words in each of the bunsetsus into which the utterance text has been divided, namely, words that configure each of the bunsetsus, are indicated. Furthermore, line segments that connects the quadrangles indicating the respective bunsetsus indicate a modification relationship among the respective bunsetsus.

In other words, at an end point of a line segment that extends from a quadrangle indicating a bunsetsu, a bunsetsu that is a modification destination of the bunsetsu is indicated. Accordingly, it can be understood, for example, that the bunsetsu "kyono (today's)" on an uppermost side in the drawing modifies the bunsetsu "odekakewa (for going-out)".

Furthermore, in the portion pointed by arrow A12, a linguistic case of a bunsetsu is indicated on a right-hand side in the drawing of a quadrangle indicating each of the bunsetsus. For example, it is indicated that a linguistic case of the bunsetsu "kyono (today's)" on the uppermost side in the drawing is an adnominal clause.

As described above, in the natural language analyzer 21, information relating to linguistic cases of bunsetsus and information indicating a structure of a modification relationship among the respective bunsetsus are obtained as a result of natural language analysis, as pointed by arrow A12.

The understanding action request position detector 22 performs processing for detecting a position in which an understanding action is requested from a user, that is, an understanding action request position where understanding action inducing words for inducing the understanding action are inserted (added), on the basis of the pieces of information that have been supplied from the natural language analyzer 21.

Specifically, the understanding action request position detector 22 detects whether a plurality of bunsetsus serving as an object case that modify the same bunsetsu serving as a predicate clause exist in a single sentence.

For example, in the example pointed by arrow A12 of a first sentence of the utterance text, each of a plurality of bunsetsus, "saifuto (a wallet)", "keitaidenwato (a mobile phone)", "kagito (a key)", "bentoto (a box lunch)", and "tokeio (a watch)", is an object case, and these bunsetsus modify the same bunsetsu "motteittekudasai (please take)." serving as a predicate clause.

In this example, the first sentence of the utterance text is a sentence indicating items to be taken by a user for going-out, namely, a list of belongings for going-out, and bunsetsus of the belongings (items) indicated by the list of belongings modify the same bunsetsu serving as a predicate clause. In other words, the first sentence is a sentence in which belongings are enumerated.

As described above, it is meant that a plurality of bunsetsus serving as an object case that modify the same bunsetsu serving as a predicate clause in a single sentence are a plurality of enumerated pieces of information that are presented to a user, such as the list of belongings for going-out described in this example. Stated another way, it is meant that a structure of a sentence in which a plurality of bunsetsus serving as an object case modify the same bunsetsu serving as a predicate clause presents a plurality of enumerated pieces of information to the user.

Accordingly, in a case where a plurality of bunsetsus serving as an object case that modify the same bunsetsu serving as a predicate clause, as described above, namely, enumerated pieces of information, are detected, the understanding action request position detector 22 specifies each position between the bunsetsus serving as an object case that modify the same bunsetsu serving as a predicate clause, namely, each position between bunsetsus indicating the enumerated pieces of information, as the understanding action request position.

This is because each of the positions between the bunsetsus indicating the enumerated pieces of information is an incomplete position in which a sentence is not concluded, and makes a user think that the sentence continues, and therefore an understanding action is likely to be induced in each of the positions between the bunsetsus and agreement on each of the items (belongings) can be obtained from the user, and each of the positions between the bunsetsus is effective as a position in which the understanding action is requested.

In the example of FIG. 2, the positions pointed by arrow W11 to arrow W14 in the first sentence of the utterance text are understanding action request positions detected by the understanding action request position detector 22. Specifically, for example, the understanding action request position pointed by arrow W11 is a position immediately after the bunsetsu "saifuto (a wallet)".

Furthermore, in a case where a plurality of sentences are included in the utterance text, the understanding action request position detector 22 does not determine that a position of a division between sentences is the understanding action request position. In other words, in a second sentence and the subsequent sentences, an end position of a sentence immediately before a target sentence is not determined to be the understanding action request position, and the target sentence is uttered without interruption. This is because a position between sentences is a position in which a sentence is concluded and therefore it is difficult to induce an understanding action. For example, in a case where an understanding action is requested from a user in a position in which a sentence is concluded, there is a possibility that the user will think that an utterance to be made by the speech interaction system has been finished.

Moreover, in a case where a plurality of sentences are included in the utterance text, the understanding action request position detector 22 detects a bunsetsu that has a first modification relationship with a bunsetsu serving as a predicate clause of a target sentence in a second sentence and the subsequent sentences, and determines a position immediately after the bunsetsu to be the understanding action request position.

This is because a position of a bunsetsu that has a first modification relationship with a predicate clause of a sentence is in a state in which the sentence is not concluded similarly to the example described above and further, in the second sentence and the subsequent sentences, similarly, the position is a position (a timing) that is effective to confirm whether the user continues to have concentration on an utterance made by the speech interaction system.

In the example of FIG. 2, in the second sentence, a position immediately after the first bunsetsu "furukamoshirenainode (because it may)" that modifies the bunsetsu "motteittekudasai (please take)." serving as a predicate clause, namely, the position pointed by arrow W15, is determined to be the understanding action request position. Here, a position immediately after a continuous modification clause, as pointed by arrow W15, is determined to be the understanding action request position, and therefore an understanding action is requested from the user in a position in which a sentence is not concluded.

Note that, in a case where enumerated pieces of information are detected in the second sentence and the subsequent sentences, namely, in a case where a plurality of bunsetsus serving as an object case that modify the same bunsetsu serving as a predicate clause are detected, positions between the object cases may be determined to be the understanding action request positions.

In the example above, the understanding action request position detector 22 detects (determines) the understanding action request position on the basis of the position of a bunsetsu that modifies a bunsetsu serving as a predicate clause in sentences of utterance text. In other words, a position based on a modification relationship with the predicate clause is detected as the understanding action request position.

<Description of Speech Utterance Processing and Understanding Action Determination Processing>

Next, an operation of the speech interaction system illustrated in FIG. 1 is described.

For example, when utterance text is supplied to the speech interaction system, the speech interaction system performs speech utterance processing for making a speech utterance and performing interaction with a user and understanding action determination processing for determining an understanding action on the basis of feedback to the speech utterance made by the speech interaction system that has been received from the user. The speech utterance processing and the understanding action determination processing described above are simultaneously performed.

First, the speech utterance processing performed by the speech interaction system is described with reference to the flowchart of FIG. 3.

In step S11, the natural language analyzer 21 performs natural language analysis on supplied utterance text, and supplies an analysis result and the utterance text to the understanding action request position detector 22. For example, in step S11, morphological analysis is performed, as described with reference to FIG. 2.

In step S12, the understanding action request position detector 22 detects an understanding action request position on the basis of the analysis result and the utterance text that have been supplied from the natural language analyzer 21, and supplies a detection result and the utterance text to the speech output interaction progress controller 23.

For example, in step S12, positions between bunsetsus serving as an object case that are enumerated pieces of information, a position immediately after a bunsetsu that has a first modification relationship with a predicate clause in the second sentence and the subsequent sentences, and the like are detected as the understanding action request position, as described with reference to FIG. 2.

In step S13, the speech output interaction progress controller 23 outputs text data of utterance words to be uttered next to the speech synthesis engine 24 on the basis of a result of detecting the understanding action request position and the utterance text that have been supplied from the understanding action request position detector 22 and a result of determining a user's understanding action that has been supplied from the understanding action determination unit 27. At this time, the speech output interaction progress controller 23 also issues, to the speech synthesis engine 24, an instruction to add intonation to an understanding action inducing words portion, as needed. Furthermore, the speech output interaction progress controller 23 appropriately gives a pause between utterances by controlling an output timing of the text data of the utterance words.

Figure 4:
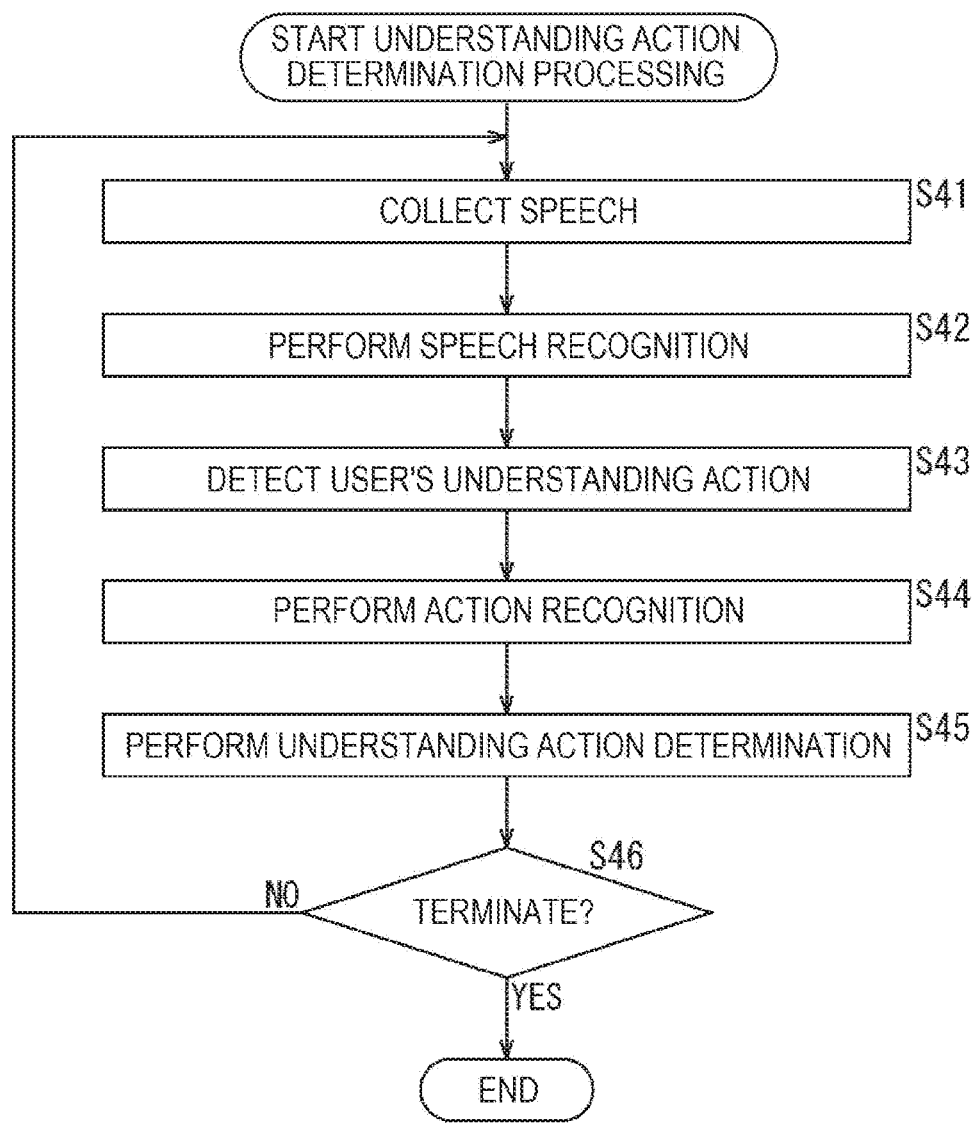
FIG. 4 is a flowchart explaining understanding action determination processing.

Here, assume that the result of determining the understanding action that is used in step S13 is obtained in the understanding action determination processing described later with reference to FIG. 4.

The speech output interaction progress controller 23 controls the progress of speech interaction with the user by determining utterance words to be uttered next for each of the understanding action request positions, and outputting text data of the determined utterance words. Furthermore, when text data of utterance words to which the understanding action inducing words have been added is output, the speech output interaction progress controller 23 gives a pause that is a time period having a predetermined length before an output of the text data of the next utterance words, and induces an understanding action.

Note that, more specifically, in determining the utterance words to be uttered next, a degree of understanding and concentration that indicates a degree of understanding and a degree of concentration of the user is used in addition to the result of determining the understanding action. The degree of understanding and concentration described above is a parameter that indicates to what extent the user concentrates on the speech utterance made by the speech interaction system and can understand the content of utterance.

In step S14, the speech synthesis engine 24 generates speech data for reproducing utterance words via speech by performing Text To Speech on the basis of the text data of the utterance words supplied from the speech output interaction progress controller 23, and outputs the speech data to the speech reproduction device 31.

In step S15, the speech reproduction device 31 reproduces the speech of the utterance words on the basis of the speech data supplied from the speech synthesis engine 24.

The user appropriately gives feedback to the speech of an utterance made as described above, by using the understanding action, and performs speech interaction with the speech interaction system. At this time, the understanding action determination processing described later with reference to FIG. 4 is performed on the understanding action performed by the user, namely, feedback.

In step S16, the speech output interaction progress controller 23 determines whether or not the speech interaction with the user will be terminated. For example, in a case where the entirety of the content of the input utterance text has been uttered, it is determined that the speech interaction will be terminated.

In step S16, in a case where it is determined that the speech interaction will not be terminated, there remains the content that has not yet been uttered, and therefore the processing returns to step S13, and the processing described above is repeatedly performed. In other words, next words are uttered.

In contrast, in step S16, in a case where it is determined that the speech interaction will be terminated, the speech interaction processing is terminated.

As described above, the speech interaction system detects the understanding action request position on the basis of a result of natural language analysis performed on utterance text, and utters next words on the basis of a detection result and a result of determining an understanding action. By doing this, an understanding action that will impose a small burden on a user, such as a quick response or nodding, can be induced at an appropriate timing, and interaction can be advanced. In other words, more appropriate interaction control can be performed.

Figure 3:
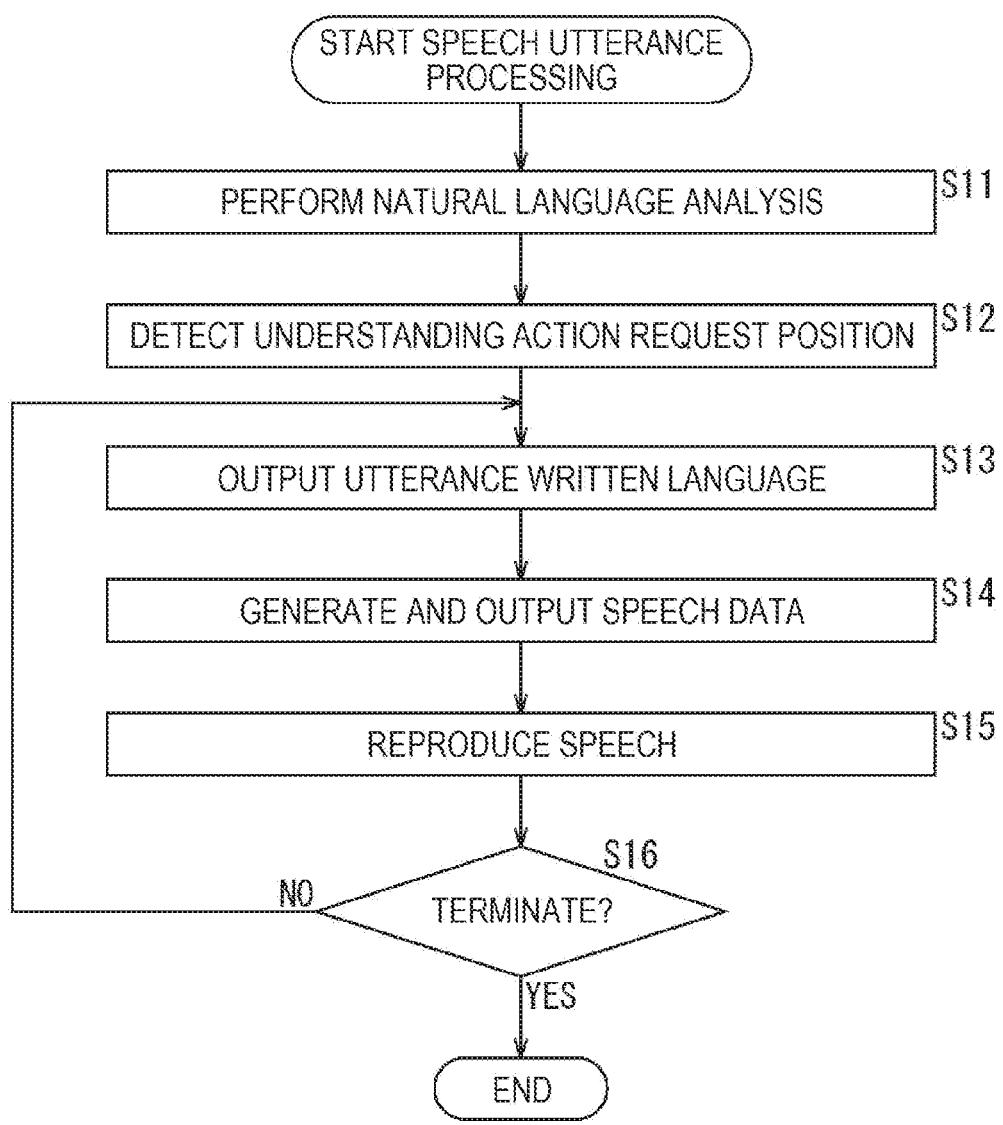
FIG. 3 is a flowchart explaining speech utterance processing.

Next, understanding action determination processing that is performed by the speech interaction system simultaneously with the speech utterance processing described with reference to FIG. 3 is described with reference to the flowchart of FIG. 4.

When a speech utterance that induces an understanding action is made by the speech interaction system in step S15 of FIG. 3, the user performs the understanding action in response to the speech utterance. For example, the user performs a negative or affirmative action, such as a quick response or nodding, as the understanding action.

Then, in step S41, the speech input device 32 collects the speech of the user's quick response serving as the understanding action, and supplies collected speech data obtained as a result to the speech recognition engine 25.

In step S42, the speech recognition engine 25 performs speech recognition on the collected speech data supplied from the speech input device 32, and supplies a result of speech recognition to the understanding action determination unit 27.

Furthermore, in step S43, the sensor 33 detects a movement of the head, namely, nodding, of the user as the user's understanding action, and supplies a detection result to the action recognition engine 26.

In step S44, the action recognition engine 26 performs action recognition on the basis of a result of detecting the user's understanding action that has been supplied from the sensor 33 so as to recognize (determine) the type of nodding of the user, and supplies a recognition result to the understanding action determination unit 27.

Note that, more specifically, the processes of step S41 and step S42 and the processes of step S43 and step S44 are performed in parallel. Furthermore, only any one of the processes of step S41 and step S42 and the processes of step S43 and step S44 may be performed.

In step S45, the understanding action determination unit 27 performs understanding action determination on the basis of at least any one of the result of speech recognition that has been supplied from the speech recognition engine 25 or a result of recognizing the type of nodding that has been supplied from the action recognition engine 26, and supplies a determination result to the speech output interaction progress controller 23.

In the understanding action determination, whether the user's understanding action is an affirmative understanding action or a negative understanding action is determined, and a determination result is used in the process of step S13 in FIG. 3 that is performed next. Stated another way, in the understanding action determination, an affirmative or negative understanding action performed by the user is detected.

For example, in the understanding action determination, in a case where the quick-response speech "un (yeah)", "hai (yes)", or the like of the user is detected as a result of speech recognition of the speech recognition engine 25, the user's understanding action is determined to be an affirmative understanding action, and a determination result indicating that the understanding action is an affirmative understanding action is output.

Furthermore, for example, in a case where a recognition result indicating that the user has shaken the head in the vertical direction is obtained as a result of recognizing the type of nodding of the action recognition engine 26, the user's understanding action is determined to be an affirmative understanding action, and a determination result indicating that the understanding action is an affirmative understanding action is output.

Note that the understanding action determination may be performed by using only any one of the result of speech recognition that has been supplied from the speech recognition engine 25 and the result of recognizing the type of nodding that has been supplied from the action recognition engine 26, as described above, or the understanding action determination may be performed by using both.

In step S46, the understanding action determination unit 27 determines whether or not the understanding action determination will be terminated. For example, in the speech utterance processing described with reference to FIG. 3, in a case where it is determined that the speech interaction will be terminated, it is determined that the understanding action determination will be terminated.

In step S46, in a case where it is determined that the understanding action determination will not be terminated, the processing returns to step S41, and the processing described above is repeatedly performed. In other words, the understanding action determination is performed on a next understanding action of the user.

In contrast, in step S46, in a case where it is determined that the understanding action determination will be terminated, the understanding action determination processing is terminated.

As described above, when speech interaction with a user is started, the speech interaction system performs the understanding action determination on the user's understanding action in the interaction so as to determine whether the understanding action is an affirmative understanding action or a negative understanding action. By performing the understanding action determination, as described above, more appropriate interaction control can be performed by using a determination result.

<Description of Interaction Progress Control Processing>

Next, a specific example of interaction progress control processing that is processing in which the speech output interaction progress controller 23 determines utterance words to be uttered next for each of the understanding action request positions, and controls the progress of speech utterance, namely, speech interaction, in step S13 of the speech utterance processing described with reference to FIG. 3, is described. In other words, interaction progress control processing performed by the speech output interaction progress controller 23 is described below with reference to the flowchart of FIG. 5.

The interaction progress control processing above is performed in each of the understanding action request positions in sentences of utterance text in step S13 of FIG. 3. In other words, the interaction progress control processing is performed at a timing at which a bunsetsu immediately before an understanding action request position of the sentences of the utterance text is uttered via speech.

Hereinafter, in particular, words of a bunsetsu immediately before an understanding action request position in the sentences of the utterance text, namely, words to be uttered next, are also particularly referred to as words to be processed.

In step S71, the speech output interaction progress controller 23 determines whether or not a degree of understanding and concentration that has been stored is greater than or equal to a predetermined threshold th1.

Here, the degree of understanding and concentration is a parameter that indicates to what extent the user concentrates on the speech utterance made by the speech interaction system and can understand the content of utterance, and is set to a predetermined initial value, for example, when the speech interaction is started. At this time, the initial value of the degree of understanding and concentration is set to have, for example, a value that is less than the threshold th1.

A value of the degree of understanding and concentration is cumulatively updated in the process of performing speech interaction with the user, for example, at a timing immediately after words are uttered in the understanding action request position, or the like, and the updated value of the degree of understanding and concentration is used in the next understanding action request position or the like.

Moreover, assume here that, as the value of the degree of understanding and concentration increases, the user is concentrating more and is performing interaction with a higher degree of understanding. In other words, as the value of the degree of understanding and concentration increases, a user has a higher degree of concentration on speech interaction and a higher degree of understanding the speech interaction.

In step S71, in a case where the degree of understanding and concentration is greater than or equal to the threshold th1, namely, in a case where a degree of concentration and a degree of understanding of the user are sufficiently high, the processing moves on to step S72.

In step S72, the speech output interaction progress controller 23 sets an utterance speed in utterance.

For example, in a state in which step S72 is performed, the user is sufficiently concentrating and has a sufficient degree of understanding, and therefore the utterance speed is set in such a way that words to be processed are uttered at a somewhat high speed. Specifically, for example, the utterance speed is determined to be a speed that has been set for a current degree of understanding and concentration. In this case, as a value of the degree of understanding and concentration increases, the utterance speed is set to be higher. Furthermore, for example, the utterance speed may be determined so as to have a value that is greater than a current value by a prescribed value.

In step S73, the speech output interaction progress controller 23 outputs the text data of the words to be processed to the speech synthesis engine 24, and performs control to make a speech utterance of the words to be processed at the utterance speed determined in step S72 without inducing the understanding action.

In this case, the speech synthesis engine 24 generates speech data in which supplied words to be processed are reproduced at a specified utterance speed under the control of the speech output interaction progress controller 23, and supplies the speech data to the speech reproduction device 31. At this time, the understanding action is not induced, and therefore understanding action inducing words are not added to words to be processed. Furthermore, the speech reproduction device 31 reproduces the speech of the words to be processed on the basis of the speech data supplied from the speech synthesis engine 24. Processing for generating and reproducing the speech data of words to be processed, as described above, corresponds to the processes of step S14 and step S15 in FIG. 3.

In this case, the speech of the words to be processed is made in a state in which the understanding action inducing words are not added to the words to be processed and at a relatively high speed. As described above, in a state in which a user has a high degree of concentration and a high degree of understanding, an understanding action is not particularly induced in the understanding action request position and speech utterance is made at a relatively high speed, so that appropriate speech interaction according to the degree of concentration and the degree of understanding of the user, namely, the user's situation, can be realized.

Note that a case is described here in which utterance speed is changed (determined) in accordance with whether or not the degree of concentration and understanding is greater than or equal to the threshold th1, namely, in accordance with the degree of understanding and concentration, but the tone of utterance speech, in addition to the utterance speed, may be changed (determined). In this case, for example, the tone of the words to be processed can be determined in such a way that, as a value of the degree of understanding and concentration increases and a user has a higher degree of concentration and a higher degree of understanding, the tone of utterance speech increases.

In step S74, the speech output interaction progress controller 23 reduces a value of the stored degree of understanding and concentration by a predetermined minute value, and sets the words to be processed to be words that follow words that have been uttered, namely, words in the next bunsetsu, in the utterance text, and the interaction progress control processing is terminated.

In step S74, the degree of understanding and concentration is reduced by a minute value in order to prevent an understanding action from never being induced in interaction that follows. As described above, even in a case where a user has a sufficiently high degree of concentration and a sufficiently high degree of understanding, the degree of understanding and concentration is appropriately updated in such a way that an understanding action is induced, and this enables the user to keep concentration, and enables more appropriate interaction control to be realized.

Furthermore, in step S71, in a case where it is determined that the degree of understanding and concentration is not greater than or equal to the threshold th1, namely, in a case where it cannot be said that the user has a sufficiently high degree of concentration and a sufficiently high degree of understanding, the processing moves on to step S75.

In step S75, the speech output interaction progress controller 23 adds understanding action inducing words to the words to be processed, and adds intonation in such a way that the intonation of a portion of the understanding action inducing words, namely, the ending of words (an utterance) obtained by adding the understanding action inducing words, rises.

For example, "ne", "desune", or the like is added as the understanding action inducing words, and the intonation of the ending is raised. Specifically, for example, in a case where words to be processed are "saifuto (a wallet)", the utterance words "saifutone" is obtained by adding "ne" as the understanding action inducing words, and the intonation of the ending portion "tone" is raised.

In step S76, the speech output interaction progress controller 23 sets an utterance speed in utterance.

In step S76, the utterance speed is set similarly to step S72. However, for example, in a case where the process of step S76 is performed, it cannot be said that the user has a sufficiently high degree of concentration and a sufficiently high degree of understanding, and therefore the utterance speed is reduced in such a way that the words to be processed are uttered at a relatively slow speed. In other words, for example, the utterance speed is changed so as to have a value that has been set for a degree of understanding and concentration at a current point in time. Alternatively, for example, a value of an utterance speed at a current point in time may be reduced by a prescribed value.

Furthermore, in step S76, similarly, the tone of utterance, in addition to the utterance speed, may be changed. In such a case, for example, when a degree of concentration and a degree of understanding of the user are low, a tone in utterance is set in such a way that the tone of utterance speech is low. In other words, the height of a tone in utterance is set on the basis of the degree of understanding and concentration.

In step S77, the speech output interaction progress controller 23 outputs, to the speech synthesis engine 24, the text data of the words to be processed to which the understanding action inducing words have been added, and performs control to make a speech utterance of the words to be processed to which the understanding action inducing words have been added in order to induce an understanding action. In other words, the speech output interaction progress controller 23 causes an utterance inducing the user's understanding action to be made in the understanding action request position.

In this case, the speech output interaction progress controller 23 issues, to the speech synthesis engine 24, an instruction to utter the words to be processed to which the understanding action inducing words have been added at the utterance speed determined in step S76, and also issues an instruction to add intonation to the ending. Furthermore, the speech output interaction progress controller 23 performs control to give a pause to utterance, and causes the user's understanding action to be induced by the understanding action inducing words, the intonation of the ending of utterance, and the pause in utterance.

The speech synthesis engine 24 generates speech data for reproducing supplied words, namely, the words to be processed and the understanding action inducing words, at a specified utterance speed and with a specified intonation under the control of the speech output interaction progress controller 23, and supplies the speech data to the speech reproduction device 31. Furthermore, the speech reproduction device 31 reproduces the speech of the words to be processed and the understanding action inducing words that have been added to the words to be processed on the basis of the speech data supplied from the speech synthesis engine 24. Processing for generating and reproducing speech data of words to be processed and the like, as described above, corresponds to the processes of step S14 and step S15 in FIG. 3.

By reproducing the speech, the speech utterance of the words to be processed is made in such a way that the understanding action inducing words are added to the words to be processed and the intonation of the ending rises, and at a relatively slow speed. As described above, in a state in which a user does not have a sufficient degree of concentration and a sufficient degree of understanding, the user is appropriately induced to perform an understanding action, and a speech utterance is made at a relatively slow speed. This enables appropriate speech interaction according to a degree of concentration and a degree of understanding of the user to be realized.

Furthermore, when the speech utterance is made, an understanding action performed by the user is awaited. In other words, the speech output interaction progress controller 23 performs utterance control so that a pause is given in order to induce the user's understanding action.

In this case, the speech output interaction progress controller 23 starts to measure a response time at a timing at which words of speech utterance are output to the speech synthesis engine 24, namely, at a timing at which an instruction on speech utterance is issued.

Here, the response time refers to a time period after the instruction on speech utterance is issued and before the user performs a certain understanding action in response to the speech utterance, namely, the user's response time.

In an understanding action waiting state after the words to be processed and the understanding action inducing words are uttered, the user is induced to perform the understanding action due to a state in which a sentence of utterance made by the speech interaction system has not been concluded, and the understanding action inducing words, intonation added to the ending, and the pause given to the utterance. The user performs an understanding action such as a quick response or nodding in response to utterance speech, and feedbacks a state of understanding of the user.

Note that in the speech utterance of step S77, in a case where the client device 12 can turn on a light emitting diode (LED) or can perform other visual presentation, a fact that the speech interaction system is not in a stopped state may be presented to the user by turning on the LED or presenting an icon or the like, for example. Furthermore, the fact that the speech interaction system is not in the stopped state may be presented to the user according to another method such as the periodic reproduction of sound effects or the like. Moreover, a fact that the understanding action is requested from the user may be visually or acoustically presented (reported).

When it enters into a state in which the user's understanding action is being awaited, as described above, the speech output interaction progress controller 23 determines in step S78 whether or not the understanding action has been performed by the user within a specified time period after the response time has started to be measured. In other words, whether or not the user's understanding action has been detected within a specified time period is determined.

For example, in step S78, in a case where a result of determining the understanding action is supplied from the understanding action determination unit 27 within a specified time period after the response time has started to be measured, it is determined that the understanding action has been performed within the specified time period.

Note that the specified time period may be a predetermined fixed time period, or may be a time period that is dynamically determined according to the degree of understanding and concentration and the like. For example, when the specified time period is determined according to the degree of understanding and concentration, an appropriate time period according to a degree of understanding and a degree of concentration of the user can be determined, for example, by reducing the specified time period as the degree of understanding and concentration increases.

In step S78, in a case where it is determined that the understanding action has not been performed within the specified time period, the user has not performed the understanding action for a while after speech utterance, and therefore in step S79, the speech output interaction progress controller 23 reduces a value of a stored degree of understanding and concentration.

In step S79, the degree of understanding and concentration is updated, for example, in such a way that a value of the degree of understanding and concentration is significantly reduced in comparison with a reduction in the degree of understanding and concentration in the process of step S74. This is because the user not performing the understanding action means a situation where the user is not listening to speech utterance or the user does not sufficiently understand the content of utterance.

In step S80, the speech output interaction progress controller 23 determines whether or not a degree of understanding and concentration after updating in step S79 is greater than or equal to a prescribed threshold th2 that has been determined in advance.

Here, assume that a value of the threshold th2 is, for example, a predetermined value that is less than a value of the threshold th1 described above.

In step S80, in a case where it is determined that the degree of understanding and concentration is not greater than or equal to the threshold th2, the speech output interaction progress controller 23 determines, in step S81, that the user is not at all listening to a speech utterance made by the speech interaction system, and terminates (stops) speech interaction with the user, and the interaction progress control processing is terminated. In this case, in step S16 of the speech interaction processing of FIG. 3 that follows, it is determined that speech interaction will be terminated.

Note that, in a case where the speech interaction is terminated in step S81, the speech output interaction progress controller 23 may determine that utterance text has not yet been uttered and may record the utterance text and the like, and after a certain time period has passed, the speech output interaction progress controller 23 may make a speech utterance having the content of the utterance text again. In this case, a timing at which the speech utterance is made can be set, for example, to a time at which the presence of the user is recognized again by the sensor 33 or the like after a certain time period has passed, or a time at which the user has a high degree of understanding and concentration, such as the time of the end of the speech utterance of other utterance text.

When the speech utterance of the utterance text that has not yet been uttered is made, the speech utterance may be made from the beginning of sentences of the utterance text.

Furthermore, in a case where the speech interaction is terminated in step S81, namely, in a case where the speech interaction is stopped in the middle, the speech output interaction progress controller 23 may generate, for example, report information that includes a message indicating that the interaction utterance has been terminated and the utterance text, and may control an output of the report information. This enables the content of the utterance text to be reported to the user according to a method other than the speech utterance.

In such a case, for example, the speech output interaction progress controller 23 transmits the report information to a terminal device, such as a smartphone, that serves as the client device 12 via a not-illustrated communication unit that is provided in the server 11, and causes the client device 12 to display the content of the utterance text, and the like that are indicated by the report information. For example, a method for transmitting the report information, namely, a reporting method, may be any method such as an electronic mail or a reporting function of an application program installed on the client device 12.

This enables a reception of the report information, and the like to be displayed on a status bar of the client device 12, or enables a pop-up of the report information to be displayed on a display screen of the client device 12, by using, for example, a notification function. As a result, the content of the utterance text can be reported to the user.

Furthermore, report information that only includes a message prompting the confirmation of the content of the utterance text may be transmitted without transmitting the report information including the content of the utterance text.

On the other hand, in step S80, in a case where it is determined that the degree of understanding and concentration is greater than or equal to the threshold th2, it is determined that the user has a low degree of concentration and a low degree of understanding but that the user is still listening to the speech utterance, and the processing moves on to step S82.

In step S82, the speech output interaction progress controller 23 performs control to make a speech utterance requesting an understanding action from the user.

In other words, the speech output interaction progress controller 23 outputs, to the speech synthesis engine 24, the text data of understanding action requesting words, such as "iidesuka (OK)?" or the like, that are words directly prompting (requesting) the user to perform an understanding action, and issues an instruction on speech utterance.

Then, the speech synthesis engine 24 generates the speech data of supplied understanding action requesting words from the text data of the understanding action requesting words in accordance with an instruction of the speech output interaction progress controller 23, and supplies the speech data to the speech reproduction device 31. Furthermore, the speech reproduction device 31 reproduces the speech of the understanding action requesting words on the basis of the speech data supplied from the speech synthesis engine 24. This causes an utterance requesting the understanding action from the user to be made. By reproducing the speech of the understanding action requesting words, as described above, the user can be prompted to perform the understanding action.

Note that the understanding action requesting words are not limited to "iidesuka (OK)?", and may be any other words. For example, in a case where the user has a remarkably low degree of understanding and concentration, words such as "kiiteru (are you listening)?" may be uttered as the understanding action requesting words.

Furthermore, in step S82, current words to be processed and understanding action inducing words that have been added to the current words to be processed may be uttered again without uttering the understanding action requesting words. In other words, by making a speech utterance inducing the understanding action in the process of step S77 again, a previous utterance may be repeated.

Moreover, in step S82, the understanding action requesting words may be uttered, and current words to be processed and understanding action inducing words that have been added to the current words to be processed may be uttered again.

Alternatively, in a case where it is determined in step S78 that the understanding action has not been performed within the specified time period, the utterance of words to be processed and understanding action inducing words that has most recently been made may be repeatedly made.

When the understanding action requesting words are uttered in step S82, then the processing returns to step S78, and the processing described above is repeatedly performed.

Furthermore, in step S78, in a case where it is determined that the understanding action has been performed within the specified time period, that is, in a case where a result of determining the understanding action has been supplied from the understanding action determination unit 27 to the speech output interaction progress controller 23 within the specified time period, the speech output interaction progress controller 23 stops the measurement of the response time, and the processing moves on to step S83.

By stopping the measurement of the response time, as described above, a response time after an instruction on the speech utterance of the words to be processed is issued and before a result of determining the understanding action is supplied is obtained. It can be said that this response time indicates a response time after a speech utterance is made and before a user performs an understanding action in response to the speech utterance.

Furthermore, in a case where it is determined that the understanding action has been performed within the specified time period, namely, in a case where the user's understanding action has been detected within the specified time period, the speech output interaction progress controller 23 controls next utterance on the basis of a result of detecting the user's understanding action and the utterance text.

In other words, in step S83, the speech output interaction progress controller 23 determines whether or not a result of determining the understanding action that has been supplied from the understanding action determination unit 27 indicates an affirmative understanding action.

In step S83, in a case where it is determined that the result does not indicate an affirmative understanding action, namely, the result indicates a negative understanding action, the user does not understand the content of utterance and has a low degree of understanding. Therefore, in step S84, the speech output interaction progress controller 23 reduces a value of a stored degree of understanding and concentration.

In step S84, the degree of understanding and concentration is updated, for example, in such a way that the value of the degree of understanding and concentration is reduced by the same value as a value by which the degree of understanding and concentration is reduced in the process of step S79 or by a value that is smaller than the value by which the degree of understanding and concentration is reduced in the process of step S79. Note that, similarly in step S84, the degree of understanding and concentration is updated in such a way that the value of the degree of understanding and concentration is significantly reduced in comparison with a reduction in the degree of understanding and concentration in the process of step S74.

When the degree of understanding and concentration is updated in step S84, then the processing returns to step S76, and the processing described above is repeatedly performed.

In this case, an utterance speed in speech utterance is set again, and the most recent content of utterance is repeatedly uttered at a slower utterance speed. In other words, in a case where the user performs a negative understanding action, the speech output interaction progress controller 23 causes an utterance made most recently to be made again.

When the process of step S84 is performed, the user has a low degree of understanding and a low degree of concentration, and therefore the content of utterance can be made to be easily understandable to the user by repeating a most recent utterance at a slower utterance speed. In addition, in this case, interaction is not advanced until the user understands the content of utterance, and therefore there is not a possibility that the user will give up understanding the content of utterance in the middle or the user will fail to understand the content of utterance.

As described above, in a case where a user has a low degree of concentration and a low degree of understanding, updating is performed in such a way that a value of the degree of understanding and concentration is reduced. Therefore, as the number of times of the induction of the understanding action increases, an utterance speed and a tone of speech utterance gradually decrease.

In contrast, in a case where it is determined in step S83 that the result indicates an affirmative understanding action, the speech output interaction progress controller 23 updates the degree of understanding and concentration on the basis of an obtained response time in step S85.

Specifically, for example, the speech output interaction progress controller 23 updates the degree of understanding and concentration in such a way that, as the response time is reduced, a value of the degree of understanding and concentration increases.

By doing this, when a response time of the affirmative understanding action performed by the user is short and the user has a high degree of concentration and a high degree of understanding, the degree of understanding and concentration cumulatively increases. Therefore, when sentences of speech utterance are advanced, an utterance speed gradually increases, and the number of times of the induction of the understanding action decreases. Furthermore, in a case where the tone of utterance is changed according to the degree of understanding and concentration, when sentences of speech utterance are advanced, the tone of utterance gradually becomes higher.

As described above, by controlling utterance in such a way that, as the response time decreases, the number of times of the induction of the understanding action decreases, the utterance speed increases, and the tone of utterance becomes higher, more appropriate interaction control according to a degree of concentration and a degree of understanding of a user can be realized.

When the degree of understanding and concentration is updated in step S85, the interaction progress control processing is terminated. Then, words of subsequent bunsetsus are appropriately uttered, a bunsetsu immediately before the next understanding action request position is determined to be new words to be processed, and the next interaction progress control processing is performed.

In other words, when the user performs an affirmative understanding action, the speech output interaction progress controller 23 performs control to utter next words that have not yet been uttered of the utterance text, so that utterance words are advanced to the next words.

As described above, the speech output interaction progress controller 23 advances speech interaction based on the content of utterance indicated in the utterance text, while appropriately setting an utterance speed, inducing an understanding action, or requesting the understanding action in accordance with the degree of understanding and concentration and the user's understanding action. This enables more appropriate interaction control to be performed according to a degree of concentration and a degree of understanding of the user.

Note that an example has been described here in which a user's understanding action is appropriately induced in the understanding action request position and interaction is advanced according to the user's understanding action.

However, the present technology is not limited to this, and for example, similarly at a timing (a time) other than the understanding action request position, the speech output interaction progress controller 23 may constantly monitor the understanding action performed by the user, and may update a value of the degree of understanding and concentration in accordance with a result of determining the understanding action.

In such a case, when an affirmative understanding action has been performed, updating is performed in such a way that the value of the degree of understanding and concentration is increased, and the understanding action is suppressed from being induced unnecessarily frequently at a later time. In contrast, when a negative understanding action has been performed, updating is performed in such a way that the value of the degree of understanding and concentration is reduced, and opportunities to induce the understanding action are increased, and the content of utterance is made to be easily understandable to the user.

Furthermore, by performing the interaction progress control processing described above, the interaction illustrated in FIG. 6 is performed, for example. This example indicates an interaction sequence example in which a speech utterance presenting a shopping list is made by the speech interaction system.

When an interaction sequence is started, interaction control is started in a state where the degree of understanding and concentration is relatively low. As pointed by arrow Q11, the speech interaction system adds the understanding action inducing words "ne" to words to be processed, and utters the words "kyonokaimonowaninjintone (please but a carrot) for which the intonation of the ending has been raised at a slow utterance speed. Here, by adding the understanding action inducing words "ne", an expression indicating that utterance words continue is made. Note that, in the drawing, an upward arrow indicates that intonation is raised.

When the words "kyonokaimonowaninjintone (please buy a carrot)" are uttered, it enters into an understanding action waiting state, a long pause is first given, and a quick response (an understanding action) is induced.

When a user makes the utterance "un (yeah)", as pointed by arrow Q12, in response to this, the speech interaction system detects an affirmative quick response on the basis of the utterance "un (yeah)", determines that the user has performed an affirmative understanding action, and starts the next speech utterance.

In other words, the speech interaction system utters the words "tamanegisankotone (three onions)" obtained by adding the understanding action inducing words to words to be processed, as pointed by arrow Q13. At this time, the intonation of the ending is raised, and an utterance is made at a slow utterance speed similarly to the case of arrow Q11.

Because the user has not performed an understanding action in response to this utterance during a specified time period or longer, the degree of understanding and concentration is reduced, and the speech interaction system utters the understanding action requesting words "iidesuka (OK)?", as pointed by arrow Q14, at a slow utterance speed.

Here, because the user has not performed the understanding action after the utterance of the words "tamanegisankotone (three onions)", it is determined that a level of consciousness of interaction, namely, a degree of concentration on interaction, of the user is reduced, the degree of understanding and concentration is reduced, and the understanding action requesting words "iidesuka (OK)?" are uttered.

Then, the user makes the utterance "e (eh)?" serving as a negative quick response, as pointed by arrow Q15, and therefore the speech interaction system determines this utterance, namely, the understanding action, and a determination result indicating that the understanding action is a negative understanding action is obtained.

As described above, when the negative understanding action is performed, the degree of understanding and concentration is further reduced, and the speech interaction system utters the words "tamanegisankotone (three onions)" serving as most recent words to be processed and understanding action inducing words that have been added to the most recent words to be processed again, as pointed by arrow Q16. At this time, an utterance is made in such a way that the intonation of the ending is raised. In other words, an utterance that is similar to the utterance pointed by arrow Q13 is repeated. In the state described above, the user has a low degree of understanding and concentration, and therefore an utterance is made at a slow utterance speed.

After the utterance of the words "tamanegisankotone (three onions)" pointed by arrow Q16, when the user makes the utterance "un (yeah)" as an understanding action within a specified time period, as pointed by arrow Q17, the speech interaction system determines that this understanding action is an affirmative understanding action.

Then, as pointed by arrow Q18, the speech interaction system utters the words "jyagaimotone (a potato)" that have been obtained by adding the understanding action inducing words to the next words to be processed at a slow utterance speed, while raising the intonation of the ending.

When the user makes the utterance "un (yeah)" as an understanding action in response to this within a specified time period, as pointed by arrow Q19, the speech interaction system utters the words "gyuniku300guramutone (300 g of beef)" that have been obtained by adding the understanding action inducing words to the next words to be processed at a slow utterance speed, while raising the intonation of the ending, as pointed by arrow Q20.

Next, in response to this, the user utters the quick-response words "un (yeah)" indicating an affirmative understanding action in a shorter response time than before, as pointed by arrow Q21.

Then, in the speech interaction system, the degree of understanding and concentration of the user is raised, and the words "shiotone (salt)" that have been obtained by adding the understanding action inducing words to the next words to be processed are uttered at a medium utterance speed in a state where the intonation of the ending is raised, as pointed by arrow Q22. That is, an utterance is made at a higher utterance speed than before due to an increase in the degree of understanding and concentration of the user.

Then, in response to this, the user utters the quick-response words "un (yeah)" indicating an affirmative understanding action in a further shorter response time than a response time in the case pointed by arrow Q21, as pointed by arrow Q23.

As a result, in the speech interaction system, the degree of understanding and concentration of the user is further raised, and the words "koshotone (pepper)" that have been obtained by adding the understanding action inducing words to the next words to be processed are uttered at a medium utterance speed in a state where the intonation of the ending is raised, as pointed by arrow Q24.

Moreover, in response to this, the user utters the quick-response words "un (yeah)" indicating an affirmative understanding action in a further shorter response time than a response time in the case pointed by arrow Q23, as pointed by arrow Q25. Then, in the speech interaction system, the degree of understanding and concentration of the user is further raised, and the next words to be processed "shoyu-tobirudesu (soy sauce and beer)." are uttered at a high utterance speed, as pointed by arrow Q26, and the interaction sequence is terminated.

In this case, the degree of understanding and concentration has a sufficiently high value due to the understanding action pointed by arrow Q25, and therefore an utterance is made without adding the understanding action inducing words between the words "shoyuto (soy sauce and)" and the next words "biru (beer)", namely, without inducing the understanding action. Furthermore, the degree of understanding and concentration has a sufficiently high value here, and therefore the utterance speed becomes highest.

Figure 6:
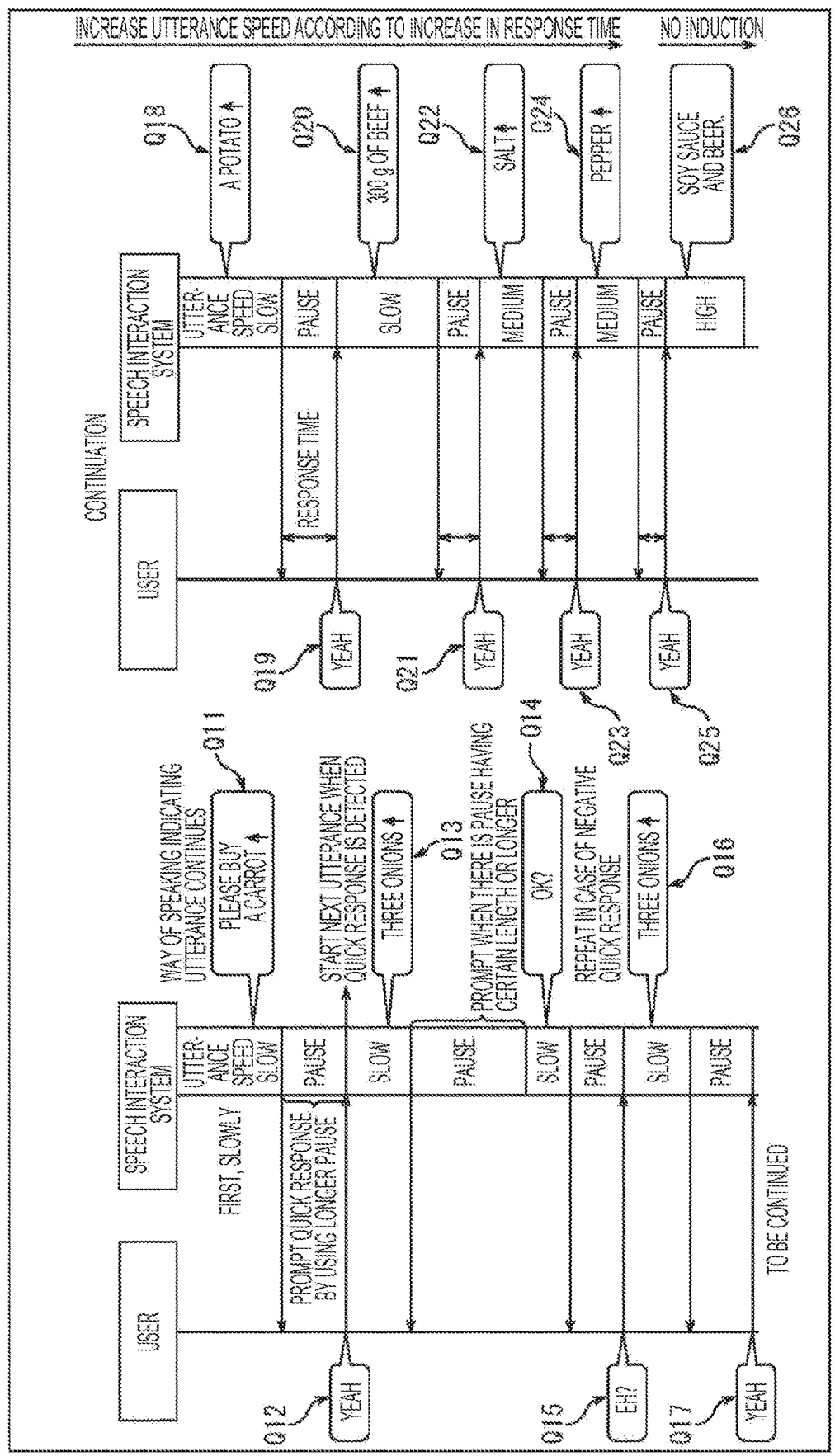
FIG. 6 is a diagram explaining an example of an interaction sequence.

As described, above, the example illustrated in FIG. 6 indicates a state where, after the utterance pointed by arrow Q16, a response time of the user to the induction of the understanding action is reduced, and accordingly, the degree of understanding and concentration of the user gradually increases.

In this example, as the degree of understanding and concentration increases, the utterance speed of a speech utterance made by the speech interaction system also increases, and the number of times of the induction of the understanding action decreases. By inducing the understanding action and changing the utterance speed according to a degree of concentration and a degree of understanding of a user, as described above, appropriate interaction control can be realized.

As described above, a speech interaction system to which the present technology has been applied enables more appropriate interaction control to be performed.

In particular, in the speech utterance of sentences including long sentences or enumerated pieces of information that are difficult to handle in Text To Speech, a speech utterance is made at an utterance speed according to a degree of concentration and a degree of understanding of a user, and this can enable the user to more easily understand and remember the content of an utterance to be surely transmitted to the user by the speech interaction system.

Furthermore, the speech interaction system to which the present technology has been applied can compensate for the content of sentences that are difficult to understand due to the speech utterance performance of general Text To Speech, namely, due to a constant intonation and utterance speed, by performing interaction using the understanding action. In other words, by changing the utterance speed or changing intonation according to a result of determining the understanding action or the response time, interaction can be performed so that a user can easily understand the content of utterance or the user can easily remember the content of utterance.

Moreover, in a case where a user has a high degree of concentration and a high degree of understanding, namely, in a case where the user is concentrating on listening to interaction speech, the utterance speed is increased, the number of times of the induction of the understanding action is reduced, and a burden that the understanding action imposes on the user is reduced, and therefore the user can perform interaction during a shorter time period and with a smaller burden.

<Another Example 1 of Detection of Understanding Action Request Position>

Note that an example has been described above in which the understanding action request position is detected on the basis of the position of a bunsetsu that modifies a bunsetsu serving as a predicate clause in sentences of utterance text, as described with reference to, for example, FIG. 2. However, the understanding action request position may be detected according to any method, if the position of a bunsetsu that includes words indicating an item or the like where the understanding action is desired to be induced can be detected.

For example, as an example of another method for detecting the understanding action request position, when six elements, when, where, who, what, why, and how, namely, a time case, a locative case, an object case, and a causal case that indicate what is called 5W1H as a case of a bunsetsu, are detected, positions immediately after bunsetsus of these cases may be determined to be understanding action request positions.

In the case described above, similarly, a position having an incomplete state as a sentence is determined to be the understanding action request position, and the understanding of a user can be confirmed on each of the information granularities of 5W1H. This example is particularly effective when understanding confirmation is desired to be performed on each of the information granularities of 5W1H.

Specifically, assume, for example, that "kyonoyoteitoshite, uchiawasenotame10jinishinagawaekideyamadasantomachiawasegaarimas u (Today, I have plans to meet Mr. Yamada at Shinagawa station at 10 o'clock for a meeting)." is input as utterance text.

In such a case, the understanding action request position detector 22 detects each of a position immediate after the bunsetsu "uchiawasenotame (for a meeting)" serving as a causal case, a position immediately after the bunsetsu "10jini (at 10 o'clock)" serving as a time case, a position immediately after the bunsetsu (shinagawaekide (at Shinagawa station)" serving as a locative case, and a position immediately after the bunsetsu "yamadasanto (Mr. Yamada)" serving as an object case as the understanding action request position.

As described above, the understanding action request position can be detected on the basis of the positions of bunsetsus serving as the time case, the locative case, the object case, and the causal case in sentences of utterance text.

Furthermore, as another method for detecting the understanding action request position, a word dictionary in which the degrees of importance of words have been registered in advance may be used. In such a case, a word dictionary in which a word is associated with the degree of importance of the word has been recorded in advance in the understanding action request position detector 22.

The understanding action request position detector 22 refers to the word dictionary, specifies the degree of importance of each of the words included in the sentences of utterance text, and detects a position immediately after a bunsetsu including a word having a high degree of importance as the understanding action request position. At this time, for example, all of the positions immediately after bunsetsus including a word for which the degree of importance is greater than or equal to a prescribed threshold may be determined as the understanding action request position. Alternatively, a prescribed number of words may be selected from words included in the sentences of utterance text in order of how high the degree of importance is, and positions immediately after bunsetsus including the selected words may be determined as the understanding action request position.

<Another Example 2 of Detection of Understanding Action Request Position>

Moreover, a case where utterance text is sentences in Japanese has been described above, but the present technology is not limited to this, and is also applicable to the case of utterance text in a language other than Japanese, such as English. In other words, the understanding action request position can be detected similarly to the example described above.

Consider, for example, a case where utterance text is sentences in English.

In English, subject+predicate (verb) appears at the beginning of a sentence, and in a case where there are a plurality of objects (object cases) that modify the predicate (the verb) from behind the predicate, these objects are determined to be enumerated pieces of information. Then, similarly to the case in Japanese, a position between the enumerated pieces of information in an incomplete state, namely, a position immediately after "," (a comma) or a position immediately after "and", is determined to be the understanding action request position, and an understanding action such as a quick response or nodding is appropriately induced at the understanding action request position.

Furthermore, in the second sentence and subsequent sentences, a position immediately after subject+predicate (verb) is determined to be the understanding action request position. In this case, similarly, an understanding action such as a quick response or nodding is appropriately induced in a state where sentences are not concluded.

As a specific example, assume, for example, that text data indicating the sentences in English "Please buy carrots, onions, potatoes, beef, and salt. Please don't forget to post the letter." is input to the natural language analyzer 21, as pointed by arrow A41 in FIG. 7.

In such a case, when natural language analysis is performed on utterance text in the natural language analyzer 21, the analysis result pointed by arrow A42 is obtained.

In the portion pointed by arrow A42, similarly to the case of FIG. 2, each quadrangle indicates a single divided section in a sentence, namely, a phrase, and in each of the quadrangles, words in each of the phrases into which the utterance text is divided are indicated. Furthermore, line segments that connect the quadrangles indicating the respective phrases indicate a modification relationship among the respective phrases. A method for indicating the modification relationship is similar to a method in the case of FIG. 2.

Moreover, in the portion pointed by arrow A42, a linguistic case and a part of speech of a phrase are indicated on a right-hand side in the drawing of a quadrangle indicating each of the phrases. For example, in the drawing, it is indicated that a linguistic case of the uppermost-side phrase "Please buy" is a predicate clause and a part of speech is a verb.

In such a case, the understanding action request position detector 22 detects a plurality of object cases (objective cases) that modify the same predicate clause (verb) from a result of natural language analysis, and determines positions between the detected plurality of object cases to be the understanding action request positions.

However, for a phrase serving as an object case that is located in the rearmost position, a position immediately after "and" included in the phrase, namely, a position between the word "and" and an object word immediately after the word "and", is determined to be the understanding action request position.

In this example, a first sentence of utterance text indicates items to be bought by a user, namely, a shopping list, and phrases serving as an object case that include the items to be bought modify the same phrase serving as a predicate clause. In other words, the first sentence is a sentence in which items to be bought are enumerated.

Figure 7:
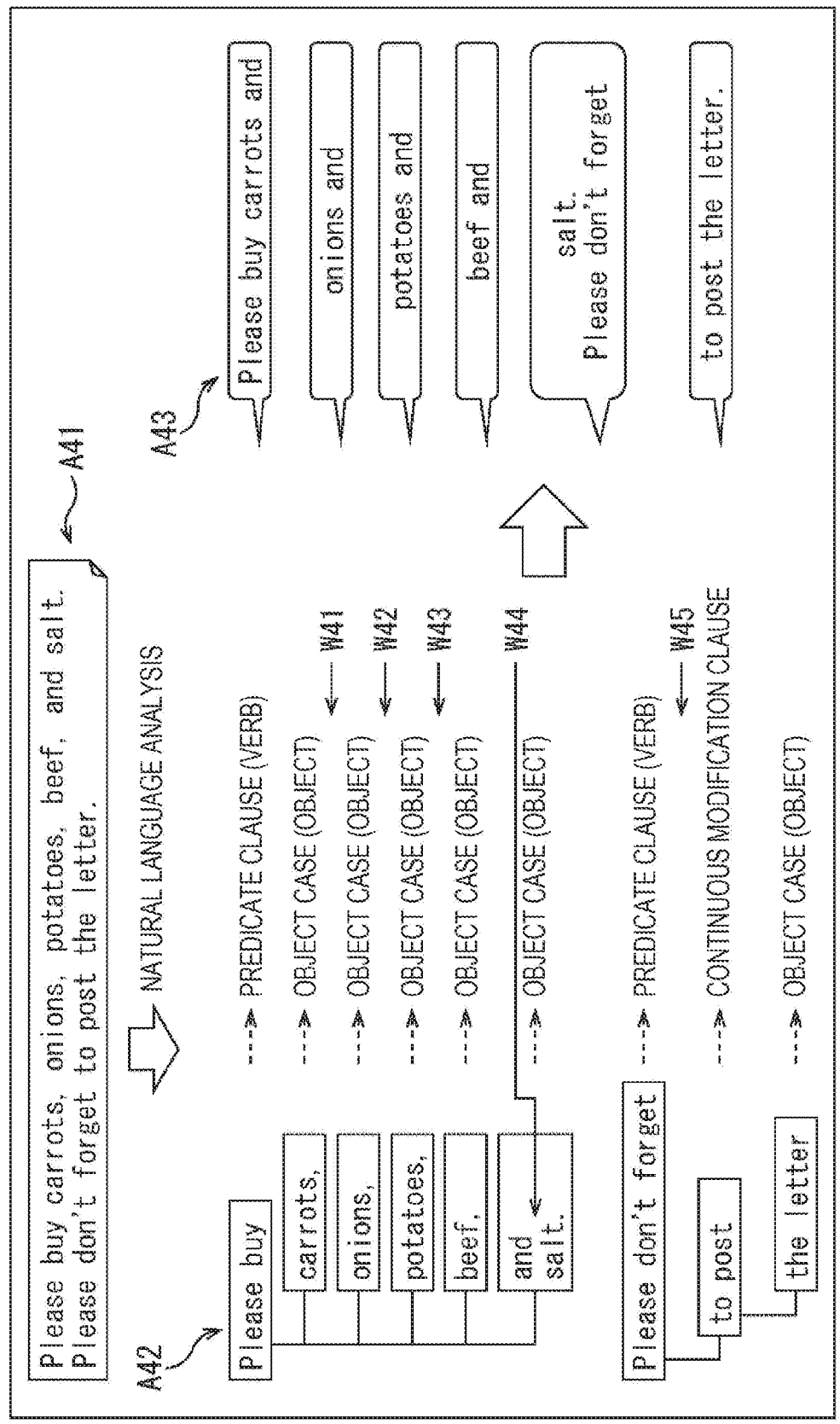
FIG. 7 is a diagram explaining the detection of an understanding action request position.

In the example of FIG. 7, the positions pointed by arrow W41 to arrow W44 in the first sentence of the utterance text are understanding action request positions detected by the understanding action request position detector 22. Specifically, for example, the understanding action request position pointed by arrow W41 is a position between the phrase "carrots," and the phrase "onions,". Furthermore, for example, the understanding action request position pointed by arrow W44 is a position between the word "and" and the object word "salt" in the phrase "and salt.".

Furthermore, in a case where a plurality of sentences are included in the utterance text, the understanding action request position detector 22 does not determine that a position of a division between sentences is the understanding action request position.

Moreover, in a case where a plurality of sentences are included in the utterance text, the understanding action request position detector 22 detects a first predicate clause in a second sentence or subsequent sentences, and determines a position immediately after a phrase serving as the first predicate clause to be the understanding action request position.

In this example, the position pointed by arrow W45 in the second sentence is determined to be the understanding action request position. Here, the position pointed by arrow W45 is a position immediately before a first phrase that modifies the phrase serving as the predicate clause.

Figure 5:
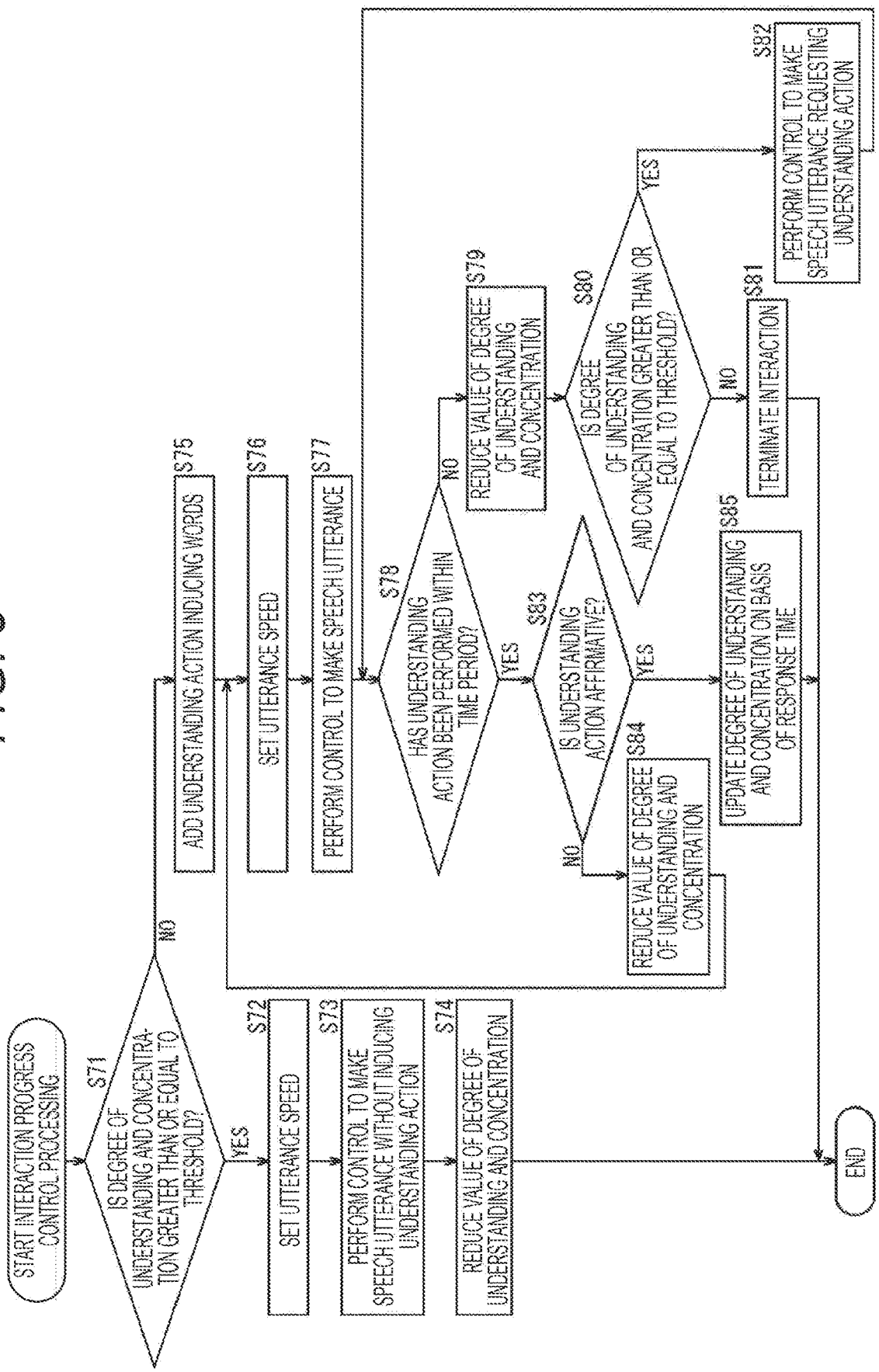
FIG. 5 is a flowchart explaining interaction progress control processing.

The speech output interaction progress controller 23 performs interaction control by performing processing that is similar to the interaction progress control processing described with reference to, for example, FIG. 5 on the basis of the understanding action request positions detected as described above.

At this time, for example, when a phrase immediately before the understanding action request position where the understanding action is induced is an object case (an object) and the word "and" is not included in a phrase next to the phrase, the speech output interaction progress controller 23 adds the word "and" in a position next to a last word (the object) in the phrase immediately before the understanding action request position, and causes a speech utterance to be made. Furthermore, in this case, when "," (a comma) exists immediately before the added word "and", "," is deleted. As described above, the word "and" that is added to a phrase of utterance words functions as the understanding action induction words.

Moreover, in speech utterance, a certain pause, namely, a time having a certain length, is given in the understanding action request position where the understanding action is induced, and a speech utterance is made.

Accordingly, in a case where the understanding action is induced in the respective understanding action request positions pointed by arrow W41 to arrow W45, a speech utterance is made, for example, as pointed by arrow A43.

In other words, first, the first words "Please buy carrots and" are uttered and the understanding action is induced, and then the words "onions and" are uttered and the understanding action is induced. Here, the understanding action is induced, for example, by giving a pause in utterance, adding the word "and", or adding intonation to the ending of utterance.

The words "potatoes and" are further uttered and the understanding action is induced, the words "beef and" are uttered and the understanding action is induced, and the words "salt. Please don't forget" are uttered and the understanding action is induced. Then, finally, the words "to post the letter." are uttered, and speech interaction is terminated.

Even when utterance text is sentences in a language other than Japanese, as described above, the understanding action request position can be detected on the basis of a position of a phrase (a bunsetsu) that modifies a predicate clause in sentences of the utterance text.

<Another Example 3 of Detection of Understanding Action Request Position>

Moreover, in a case where utterance text is sentences in English, when a location, a time, or a cause is indicated by a preposition in what is called 5W1H, a position immediately after the preposition may be determined to be the understanding action request position, and an understanding action such as a quick response or nodding may be induced in the understanding action request position. In this case, similarly, an understanding action such as a quick response or nodding is appropriately induced in a state where sentences are not concluded.

Figure 8:
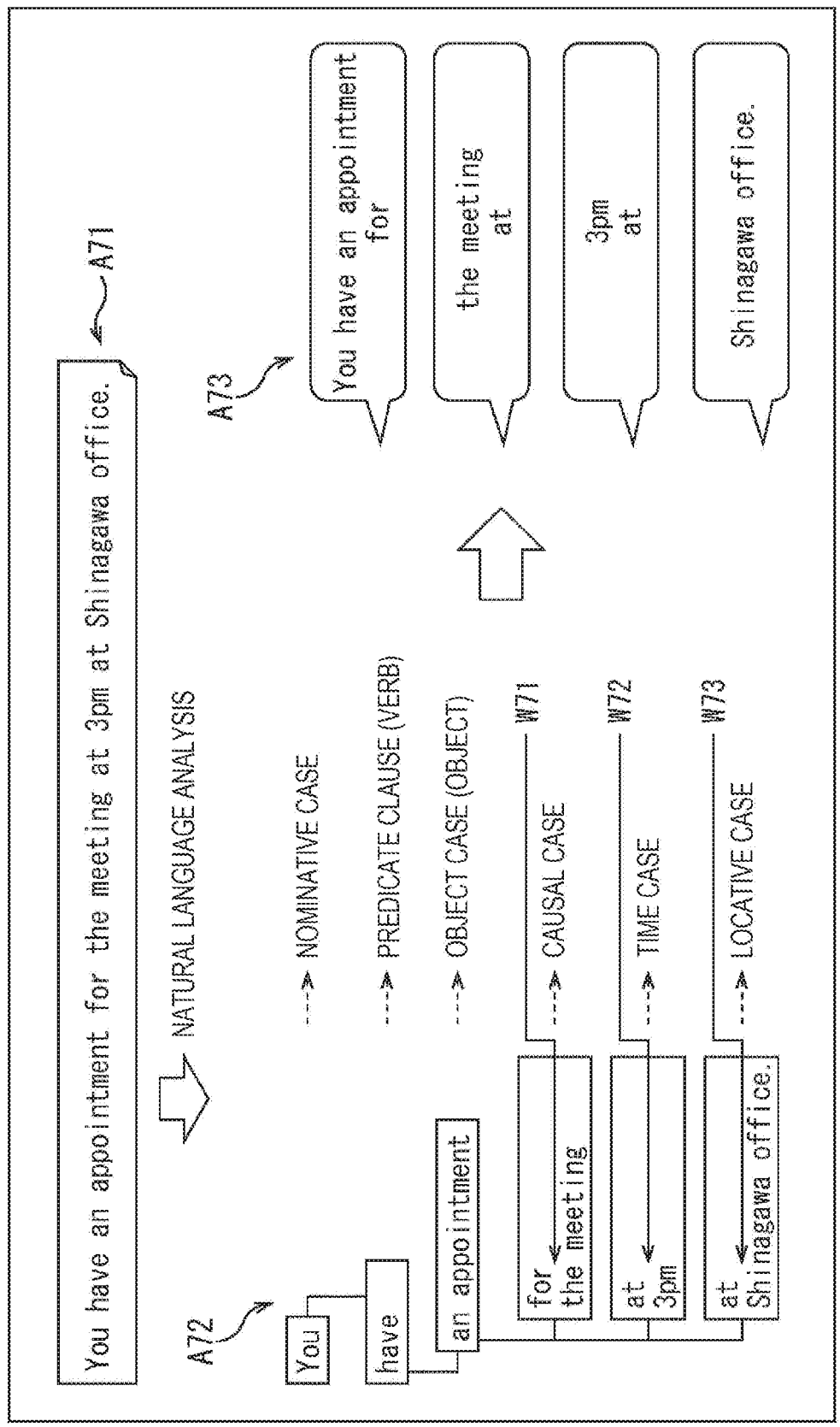
FIG. 8 is a diagram explaining the detection of an understanding action request position.

Specifically, assume, for example, that text data indicating the sentences in English "You have an appointment for the meeting at 3 pm at Shinagawa office." is input to the natural language analyzer 21, as pointed by arrow A71 in FIG. 8.

In such a case, when natural language analysis is performed on utterance text in the natural language analyzer 21, the analysis result pointed by arrow A72 is obtained.

In the portion pointed by arrow A72, similarly to the case of FIG. 2, each quadrangle indicates a single divided section in a sentence, namely, a phrase, and in each of the quadrangles, words in each of the phrases into which the utterance text is divided are indicated. Furthermore, line segments that connect the quadrangles indicating the respective phrases indicate a modification relationship among the respective phrases. A method for indicating the modification relationship is similar to a method in the case of FIG. 2.

Moreover, in the portion pointed by arrow A72, a linguistic case of a phrase is indicated on a right-hand side in the drawing of a quadrangle indicating each of the phrases. Furthermore, a part of speech, in addition to the case, is indicated, as needed. For example, in the drawing, it is indicated that a linguistic case of the phrase "You" on the uppermost side is a nominative case.

In such a case, the understanding action request position detector 22 detects phrases serving as a causal case, a time case, and a locative case from a result of natural language analysis, and determines positions immediately after prepositions within (in) the detected phrases to be the understanding action request positions.

Accordingly, in the example illustrated in FIG. 8, a position immediately after the preposition "for" in a phrase serving as a causal case of the utterance text, namely, the position pointed by arrow W71, a position immediately after the preposition "at" in a phrase serving as a time case, namely, the position pointed by arrow W72, and a position immediately after the preposition "at" in a phrase serving as a locative case, namely, the position pointed by arrow W73, are detected by the understanding action request position detector 22. Then, the position pointed by each of arrow W71 to arrow W73 is determined to be the understanding action request position.

The speech output interaction progress controller 23 performs interaction control by performing processing that is similar to the interaction progress control processing described with reference to, for example, FIG. 5 on the basis of the understanding action request positions detected as described above. At this time, a pause having a certain length is given in the understanding action request positions where the understanding action is induced, and a speech utterance is made.

Accordingly, in a case where the understanding action is induced in the respective understanding action request positions pointed by arrow W71 to arrow W73, a speech utterance is made, for example, as pointed by arrow A73.

In other words, first, the first words "You have an appointment for" are uttered and the understanding action is induced, and then the words "the meeting at" are uttered and the understanding action is induced. Here, the understanding action is induced, for example, by giving a pause in utterance or adding intonation to the ending of utterance.

The words "3 pm at" are further uttered and the understanding action is induced, the words "Shinagawa office." are finally uttered, and speech interaction is terminated.

Even when utterance text is sentences in a language other than Japanese, as described above, the understanding action request position can be detected on the basis of the positions of phrases (bunsetsus) serving as a locative case, an object case, and a causal case in sentences of the utterance text.

<Example of Configuration of Computer>

Meanwhile, the series of processes described above can be implemented by hardware, or can be implemented by software. In a case where the series of processes is implemented by software, a program that configures the software is installed on a computer. Here, the computer includes a computer that is incorporated into dedicated hardware, and includes, for example, a general-purpose personal computer or the like that can execute various functions by installing various programs.

Figure 9:
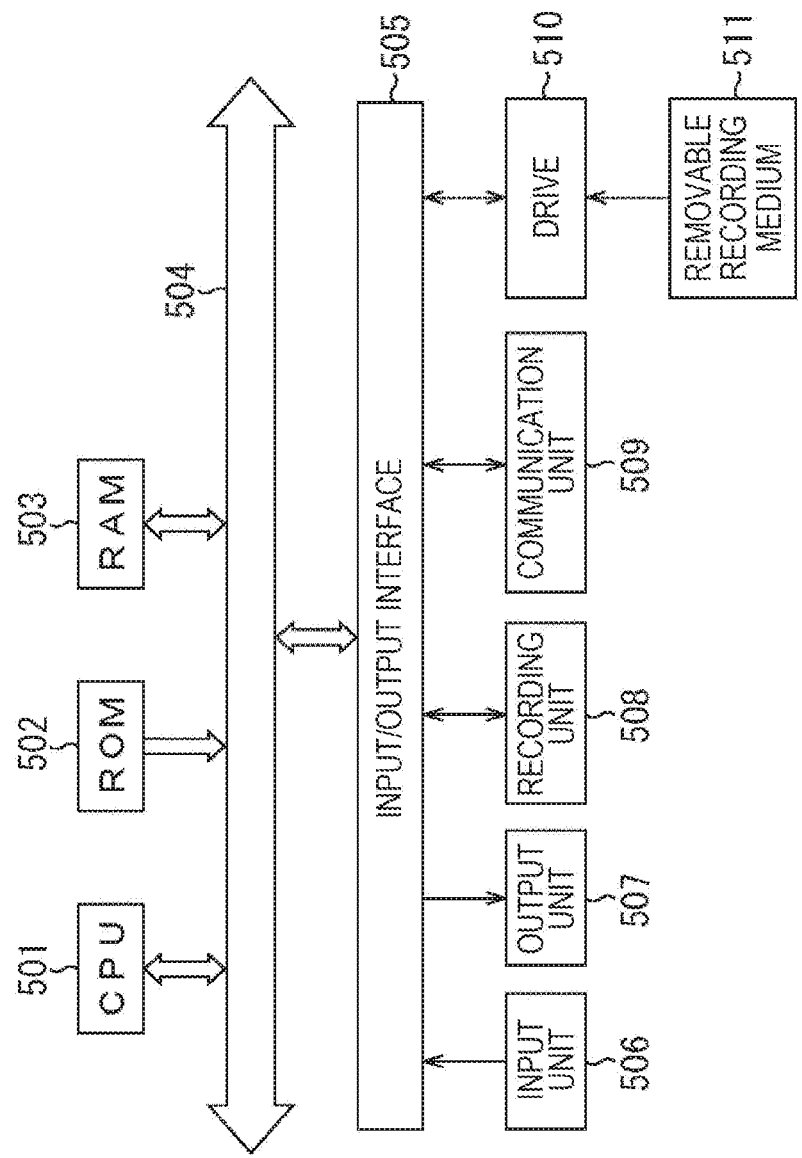
FIG. 9 illustrates an example of the configuration of a computer.

FIG. 9 is a block diagram illustrating an example of the configuration of hardware of a computer that executes the series of processes described above using a program.

In the computer, a central processing unit (CPU) 501, a read only memory (ROM) 502, and a random access memory (RAM) 503 are connected to each other via a bus 504.

An input/output interface 505 is further connected to the bus 504. An input unit 506, an output unit 507, a recording unit 508, a communication unit 509, and a drive 510 are connected to the input/output interface 505.

The input unit 506 is configured by a keyboard, a mouse, a microphone, an image sensor, and the like. The output unit 507 is configured by a display, a speaker, and the like. The recording unit 508 is configured by a hard disk, a non-volatile memory, and the like. The communication unit 509 is configured by a network interface and the like. The drive 510 drives a removable recording medium 511 such as a magnetic disk, an optical disk, a magneto-optical disk, or a semiconductor memory.

In the computer configured as described above, the CPU 501 loads, for example, a program recorded in the recording unit 508 into the RAM 503 via the input/output interface 505 and the bus 504 and executes the program, so that the series of processes described above is performed.

The program executed by the computer (the CPU 501) can be recorded, for example, as a package medium or the like in the removable recording medium 511, and can be provided. Furthermore, the program can be provided via a wired or wireless transmission medium such as a local area network, the Internet, or digital satellite broadcasting.

In the computer, the program can be installed on the recording unit 508 via the input/output interface 505 by mounting the removable recording medium 511 onto the drive 510. Furthermore, the program can be received by the communication unit 509 via the wired or wireless transmission medium, and can be installed on the recording unit 508. Alternatively, the program can be installed in advance on the ROM 502 or the recording unit 508.

Note that the program executed by the computer may be a program that causes processing to be performed in time series in the order described herein, or may be a program that causes processing to be performed in parallel or at a required timing such as a timing at which calling is executed.

Furthermore, embodiments according to the present technology are not limited to the embodiment described above, and various changes can be made without departing from the scope of the present technology.

For example, the present technology can employ a configuration of cloud computing in which a single function is shared by a plurality of apparatuses via a network and the plurality of apparatuses perform processing in cooperation with each other.

Furthermore, the respective steps described in the flowcharts described above can be performed by a single apparatus, or can be shared and performed by a plurality of apparatuses.

Moreover, in a case where a plurality of processes are included in a single step, the plurality of processes included in the single step can be performed by a single apparatus, or can be shared and performed by a plurality of apparatuses.

Moreover, the present technology can also employ the configuration described below.

(1)

An interaction control apparatus including:

an interaction progress controller that causes an utterance to be made in one or a plurality of understanding action request positions on the basis of utterance text that has been divided in the one or the plurality of understanding action request positions, the utterance inducing a user to perform an understanding action, and that controls a next utterance on the basis of a result of detecting the understanding action and the utterance text.

(2)

The interaction control apparatus according to (1), in which in a case where the understanding action performed by the user is an affirmative action, the interaction progress controller causes next words that have not yet been uttered of the utterance text to be uttered.

(3)

The interaction control apparatus according to (1) or (2), in which in a case where the understanding action performed by the user is a negative action, the interaction progress controller causes an utterance made most recently to be made again.

(4)

The interaction control apparatus according to any one of (1) to (3), in which the interaction progress controller controls an utterance based on the utterance text in such a way that, as a response time of an affirmative understanding action performed by the user is reduced, a number of times of induction of the understanding action is also reduced.

(5)

The interaction control apparatus according to any one of (1) to (4), in which the interaction progress controller controls an utterance based on the utterance text in such a way that, as a response time of an affirmative understanding action performed by the user is reduced, an utterance speed is increased.

(6)

The interaction control apparatus according to any one of (1) to (5), in which the interaction progress controller controls an utterance based on the utterance text in such a way that, as a response time of an affirmative understanding action performed by the user is reduced, a tone of the utterance becomes higher.

(7)

The interaction control apparatus according to any one of (1) to (6), in which in a case where the understanding action performed by the user is not detected within a prescribed time period, the interaction progress controller causes an utterance made most recently to be made again or causes an utterance requesting the understanding action to be made.

(8)

The interaction control apparatus according to any one of (1) to (7), in which in a case where an utterance based on the utterance text is stopped in a middle, the interaction progress controller controls an output of report information including the utterance text.

(9)

The interaction control apparatus according to any one of (1) to (8), in which the interaction progress controller causes an utterance inducing the understanding action to be made by adding incomplete words to words based on the utterance text.

(10)

The interaction control apparatus according to (9), in which the interaction progress controller causes the utterance inducing the understanding action to be made by adding intonation to an ending of an utterance.

(11)

The interaction control apparatus according to any one of (1) to (10), in which the interaction progress controller causes an utterance inducing the understanding action to be made by giving a pause in each of the one or the plurality of understanding action request positions.

(12)

The interaction control apparatus according to any one of (1) to (11), further including:

an understanding action request position detector that detects, as each of the one or the plurality of understanding action request positions, a position where a sentence in sentences of the utterance text is not concluded.

(13)

The interaction control apparatus according to (12), in which the understanding action request position detector detects, as each of the one or the plurality of understanding action request positions, a position based on a modification relationship with a predicate clause of the sentences of the utterance text.

(14)

The interaction control apparatus according to (13), in which the understanding action request position detector detects, as the one or the plurality of understanding action request positions, respective positions between a plurality of bunsetsus or phrases serving as an object case, the plurality of bunsetsus or phrases modifying an identical predicate clause in the sentences of the utterance text.

(15)

The interaction control apparatus according to (13), in which the understanding action request position detector detects, as each of the one or the plurality of understanding action request positions, a position of a bunsetsu or a phrase that first modifies the predicate clause in the sentences of the utterance text.

(16)

The interaction control apparatus according to (12), in which the understanding action request position detector detects, as each of the one or the plurality of understanding action request positions, a position of a bunsetsu or a phrase serving as a time case, a locative case, an object case, or a causal case in the sentences of the utterance text.

(17)

An interaction control method including:

a step of causing an utterance to be made in one or a plurality of understanding action request positions on the basis of utterance text that has been divided in the one or the plurality of understanding action request positions, the utterance inducing a user to perform an understanding action, and controlling a next utterance on the basis of a result of detecting the understanding action and the utterance text.

REFERENCE SIGNS LIST

11 Server
12 Client device
21 Natural language analyzer
22 Understanding action request position detector
23 Speech output interaction progress controller
24 Speech synthesis engine
27 Understanding action determination unit

The invention claimed is:

1. An interaction control apparatus, comprising:
an interaction progress controller configured to:
receive utterance text from a user;
divide the utterance text at a plurality of understanding action request positions of the utterance text;
add incomplete words to words of the utterance text at the plurality of understanding action request positions;
control, based on the addition of the incomplete words, an utterance in at least one understanding action request position of the plurality of understanding action request positions;
receive an understanding action from the user based on the utterance in the at least one understating action request position; and
control a next utterance based on the understanding action and the utterance text.

2. The interaction control apparatus according to claim 1, wherein
the interaction progress controller is further configured to control, based on the received understanding action is an affirmative action from the user, the next utterance that corresponds to next words that have not yet been uttered of the utterance text.

3. The interaction control apparatus according to claim 1, wherein
the interaction progress controller is further configured to repeat the utterance based on the received understanding action is a negative action from the user.

4. The interaction control apparatus according to claim 1, wherein
the interaction progress controller is further configured to control, based on a decrease in a response time of the received understanding action, the utterance to reduce a count of the reception of the understanding action from the user, and
the received understanding action is an affirmative action from the user.

5. The interaction control apparatus according to claim 1, wherein
the interaction progress controller is further configured to control, based on a decrease in a response time of the received understanding action, the utterance to increase a speed of the utterance, and
the received understanding action is an affirmative action from the user.

6. The interaction control apparatus according to claim 1, wherein
the interaction progress controller is further configured to control, based on a decrease in a response time of the received understanding action, the utterance to increase a tone of the utterance, and
the received understanding action is an affirmative action from the user.

7. The interaction control apparatus according to claim 1, wherein
the interaction progress controller is further configured to one of repeat the utterance or request the understanding action from the user based on a failure to receive the understanding action within a specific time period.

8. The interaction control apparatus according to claim 1, wherein
the interaction progress controller is further configured to control, based on a termination of the utterance, an output of report information, and
the report information includes the utterance text.

9. The interaction control apparatus according to claim 1, wherein the interaction progress controller is further configured to:
add intonation to an end of the utterance; and
control the utterance based on the addition of the intonation.

10. The interaction control apparatus according to claim 1, wherein the interaction progress controller is further configured to:
add a pause at the plurality of understanding action request positions of the utterance text; and
control, based on the addition of the pause, the utterance in the at least one understanding action request position.

11. The interaction control apparatus according to claim 1, further comprising an understanding action request position detector configured to detect, from the plurality of understanding action request positions, the at least one understanding action request position in which at least one sentence of a plurality of sentences of the utterance text is not concluded.

12. The interaction control apparatus according to claim 11, wherein the understanding action request position detector is further configured to detect, from the plurality of understanding action request positions, the at least one understanding action request position based on a modification relationship with a predicate clause of the plurality of sentences of the utterance text.

13. The interaction control apparatus according to claim 12, wherein
the understanding action request position detector is further configured to detect, from the plurality of understanding action request positions, respective understanding action request positions between one of a plurality of bunsetsus or a plurality of phrases serving as an object case, and
one of the plurality of bunsetsus or the plurality of phrases modifies an identical predicate clause in the plurality of sentences of the utterance text.

14. The interaction control apparatus according to claim 12, wherein
the understanding action request position detector is further configured to detect, from the plurality of understanding action request positions, the at least one understanding action request position corresponding to one of a bunsetsu or a phrase, and
one of the bunsetsu or the phrase modifies the predicate clause in the plurality of sentences of the utterance text.

15. The interaction control apparatus according to claim 11, wherein the understanding action request position detector is further configured to detect, from the plurality of understanding action request positions, the at least one understanding action request position corresponding to one of a bunsetsu or a phrase, and one of the bunsetsu or the phrase serves as one of a time case, a locative case, an object case, or a causal case in the plurality of sentences of the utterance text.

16. An interaction control method, comprising:

receiving utterance text from a user;

dividing the utterance text at a plurality of understanding action request positions of the utterance text;

adding incomplete words to words of the utterance text at the plurality of understanding action request positions;

controlling, based on the addition of the incomplete words, an utterance in at least one understanding action request position of the plurality of understanding action request positions;

receiving an understanding action from the user based on the utterance in the at least one understating action request position; and controlling a next utterance based on the understanding action and the utterance text.

17. An interaction control apparatus, comprising:

an interaction progress controller configured to:

receive utterance text from a user;

divide the utterance text at a plurality of understanding action request positions of the utterance text;

control, based on the utterance text, an utterance in at least one understanding action request position of the plurality of understanding action request positions;

receive an understanding action from the user based on the utterance in the at least one understating action request position;

control, based on a decrease in a response time of the received understanding action, the utterance to increase a tone of the utterance, wherein the received understanding action is an affirmative action from the user; and control a next utterance based on the understanding action and the utterance text.

* * * * *